March 22, 1966   D. McL. FROTHINGHAM   3,242,477
ANALOG-DIGITAL CONVERSION, COMPARING AND CONTROL SYSTEM
Filed May 8, 1961                                        10 Sheets-Sheet 1
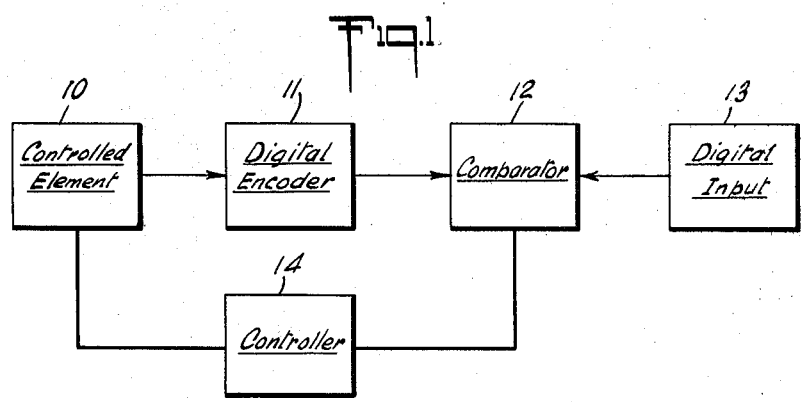
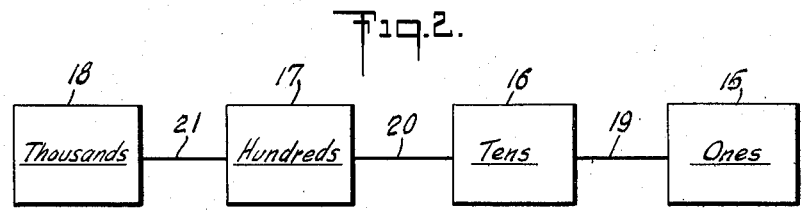
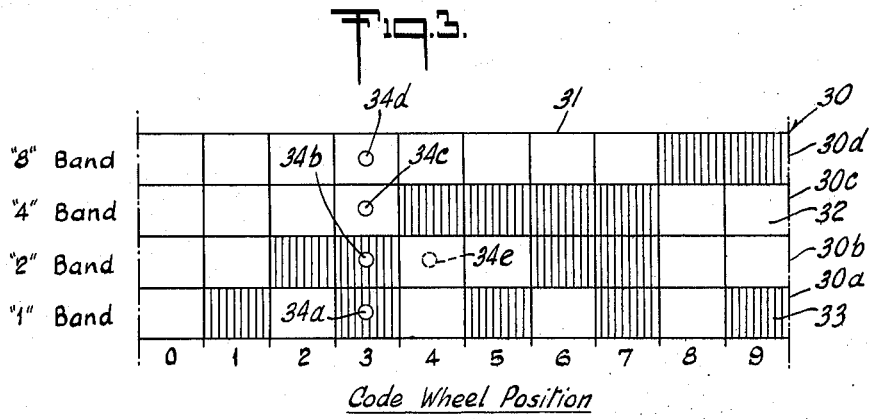

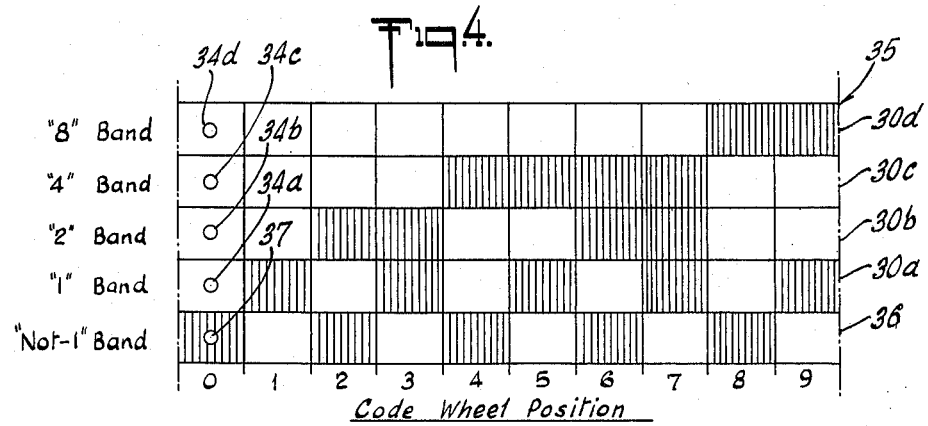
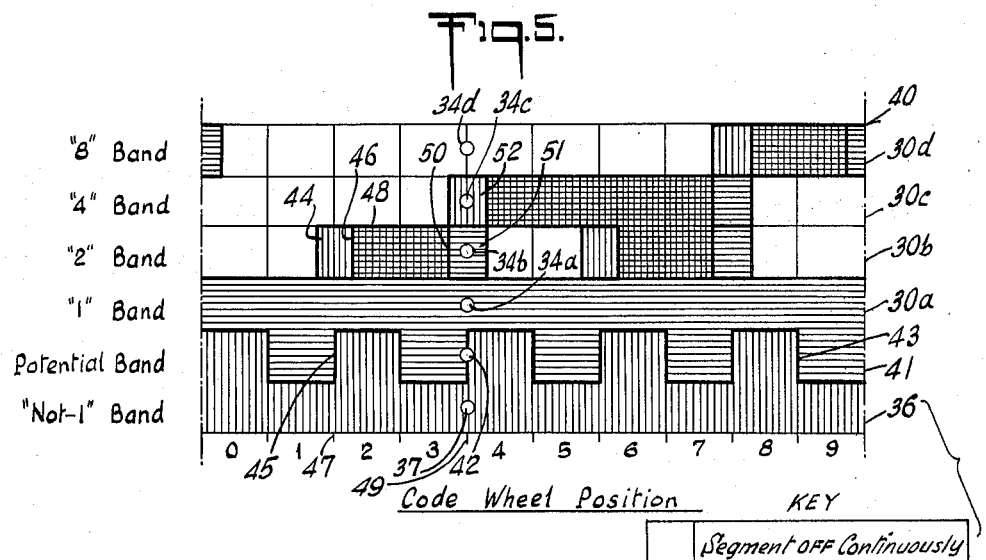
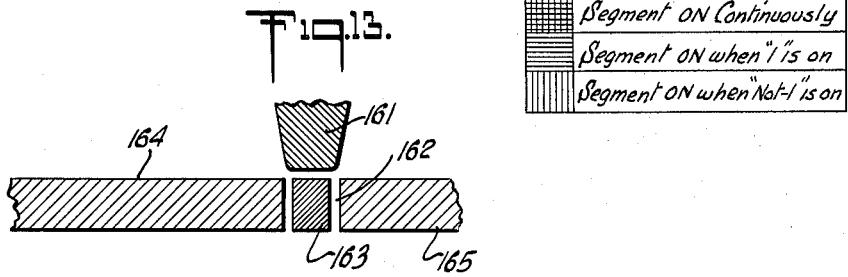

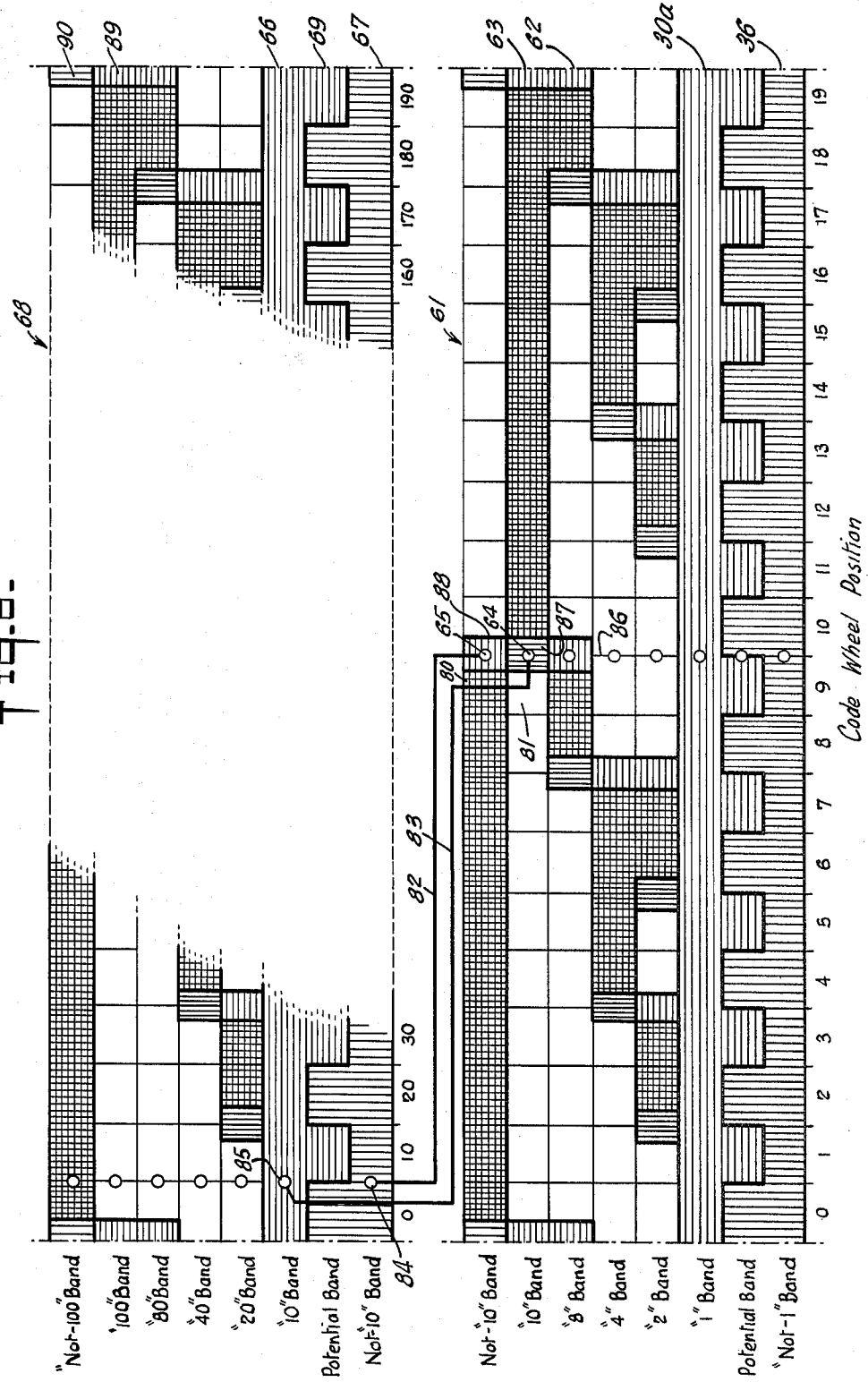

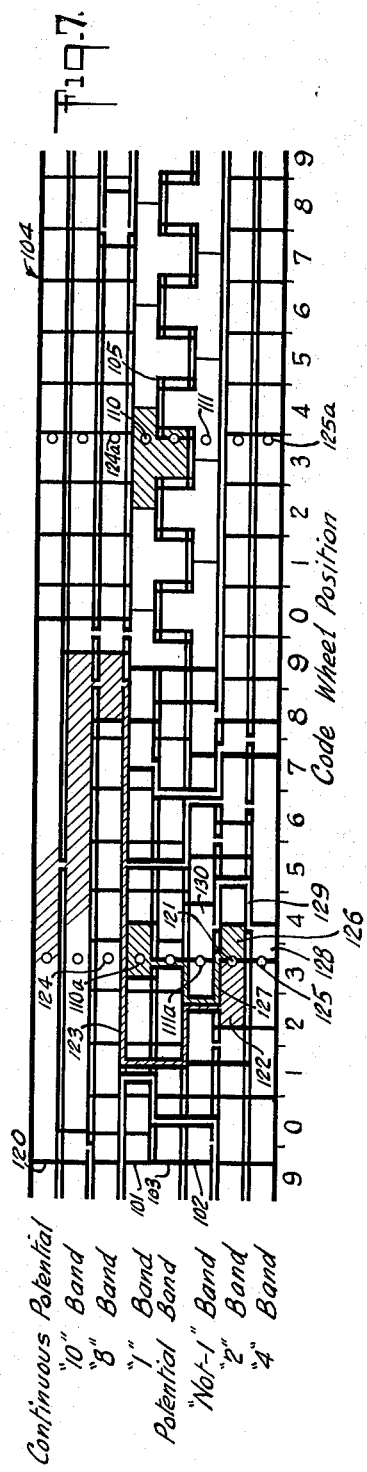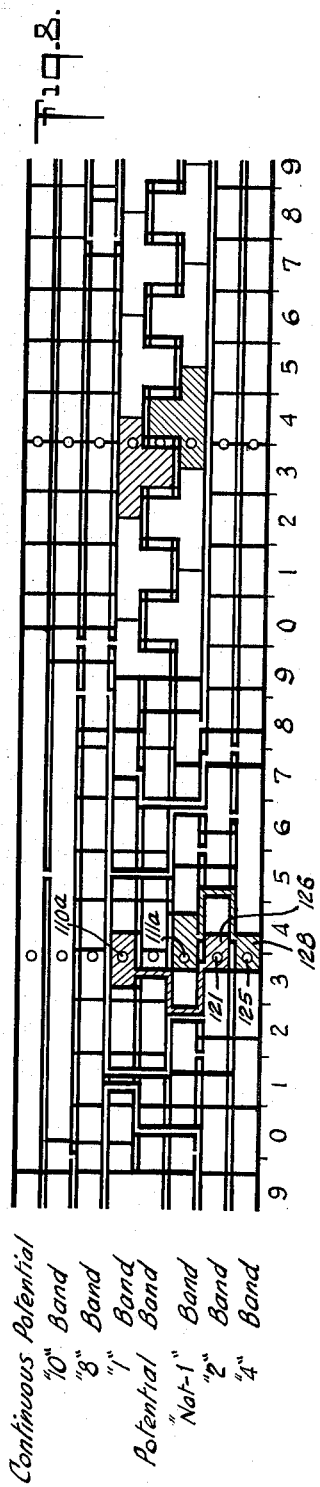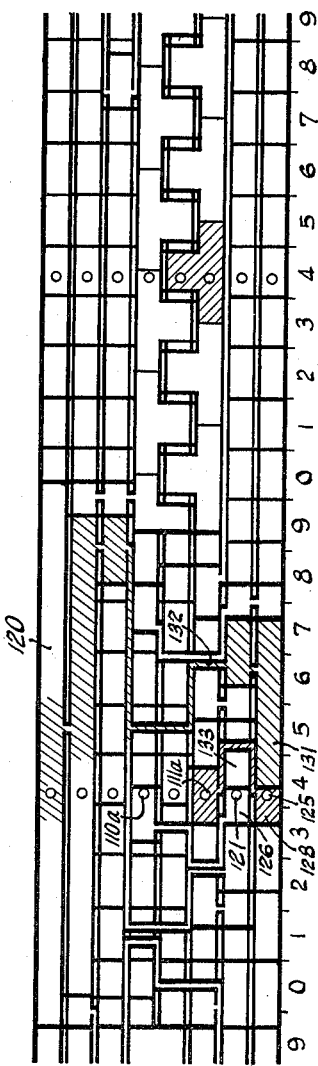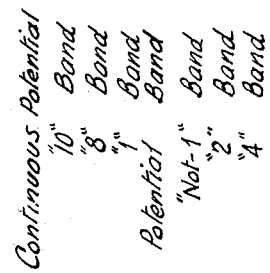

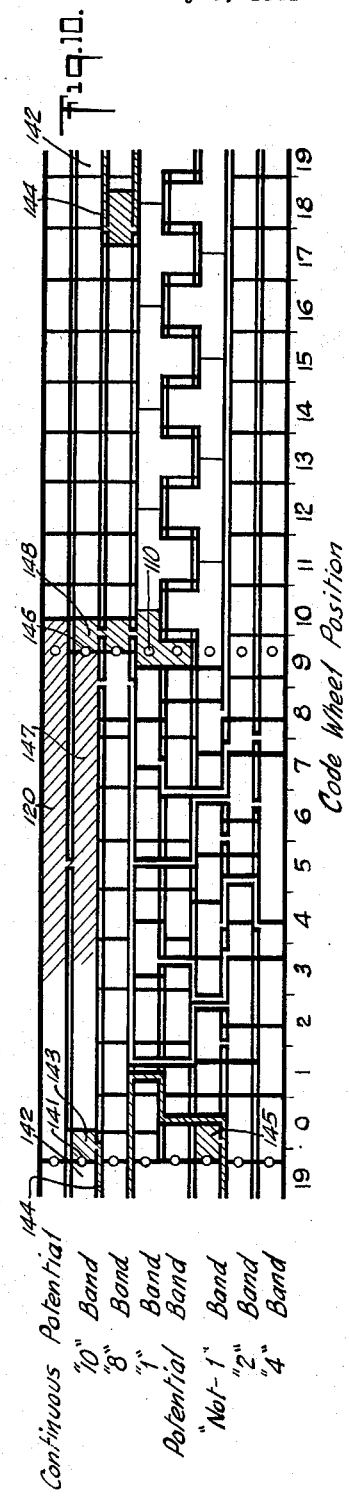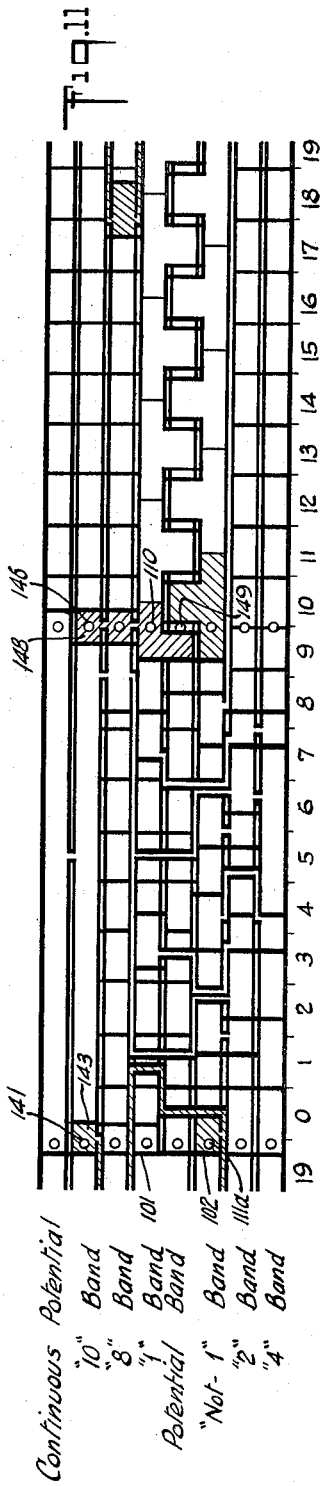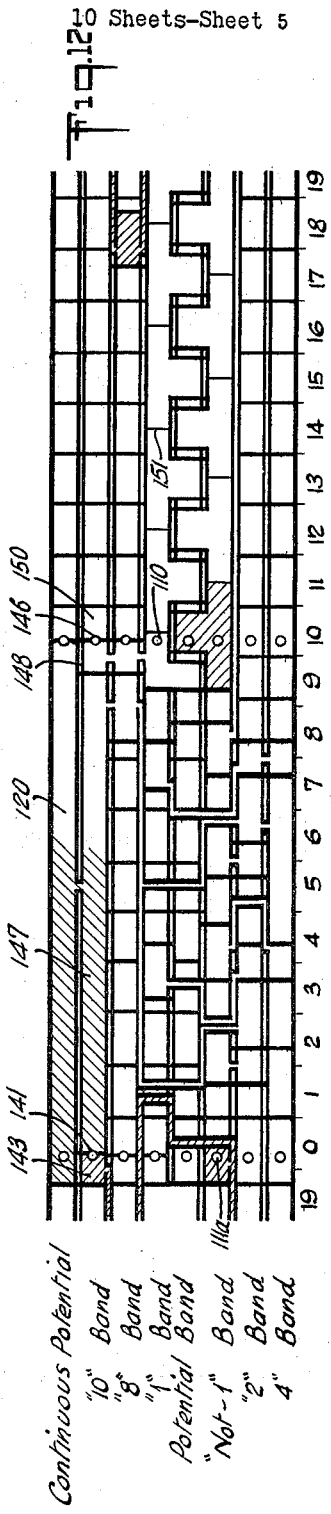

March 22, 1966     D. McL. FROTHINGHAM     3,242,477
ANALOG-DIGITAL CONVERSION, COMPARING AND CONTROL SYSTEM
Filed May 8, 1961     10 Sheets-Sheet 6

$A =$ Voltage at Grid of Thyratron Tube when it fires and when $K = \frac{r_b}{r_g} = 0.1$
$B = $ " " " " " " " $\frac{r_b}{r_g} = 0.05$
$C = $ " " Major Apex when the Bridge is balanced

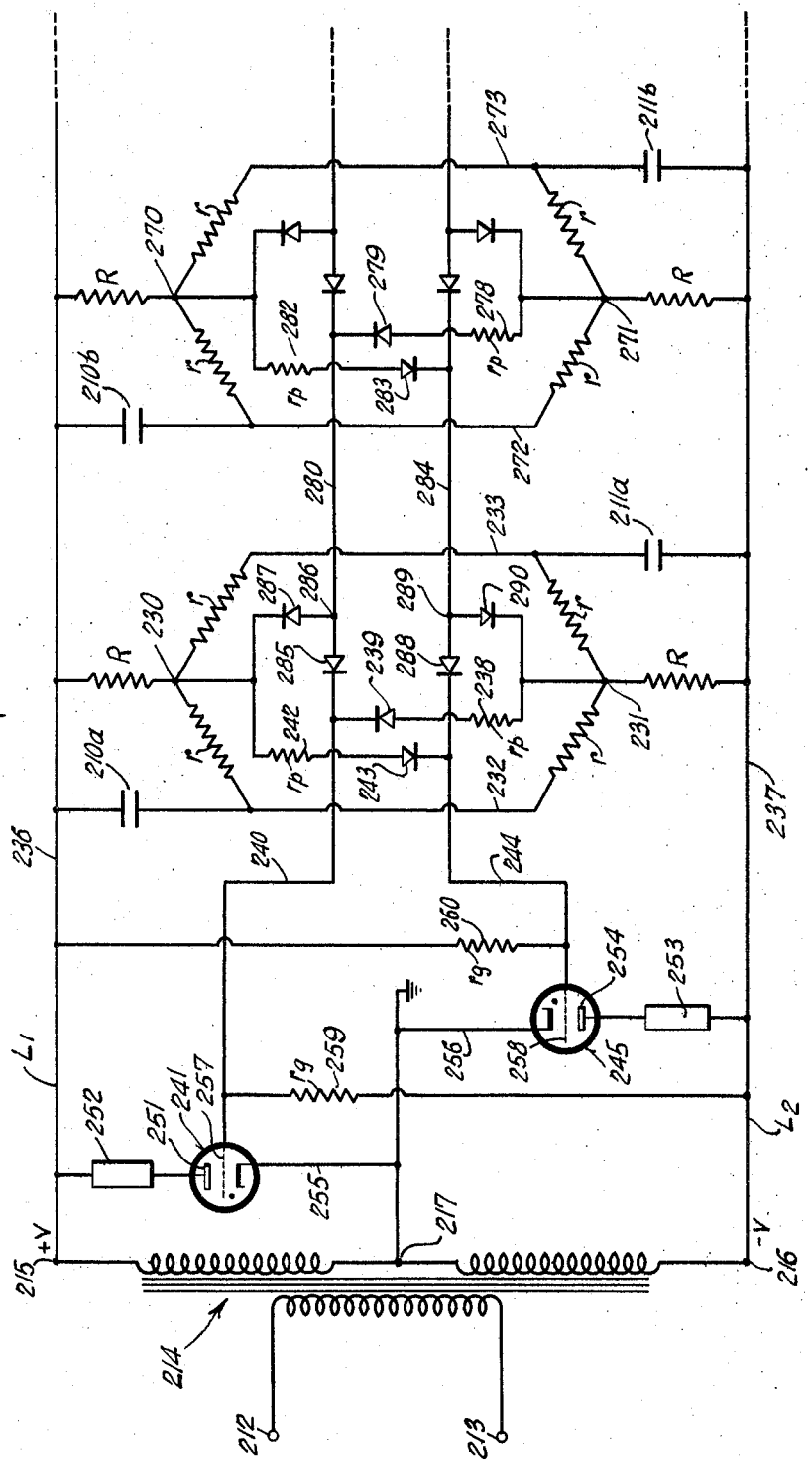

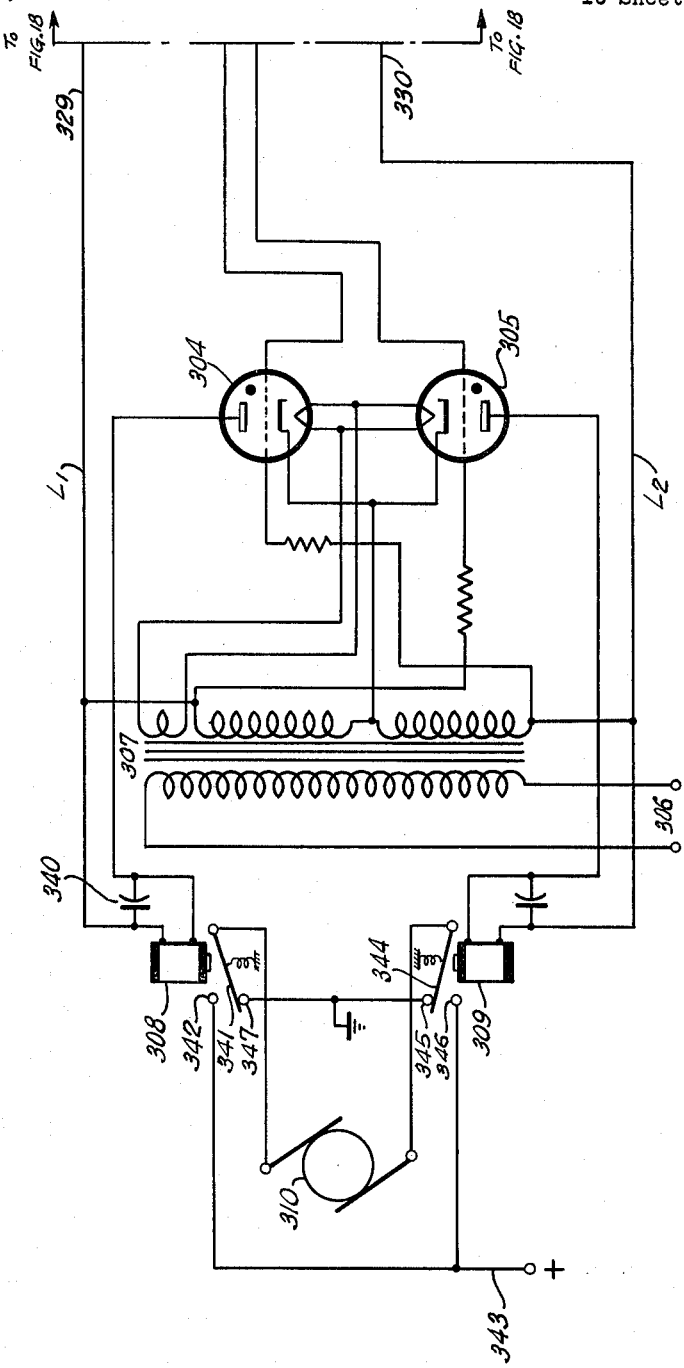

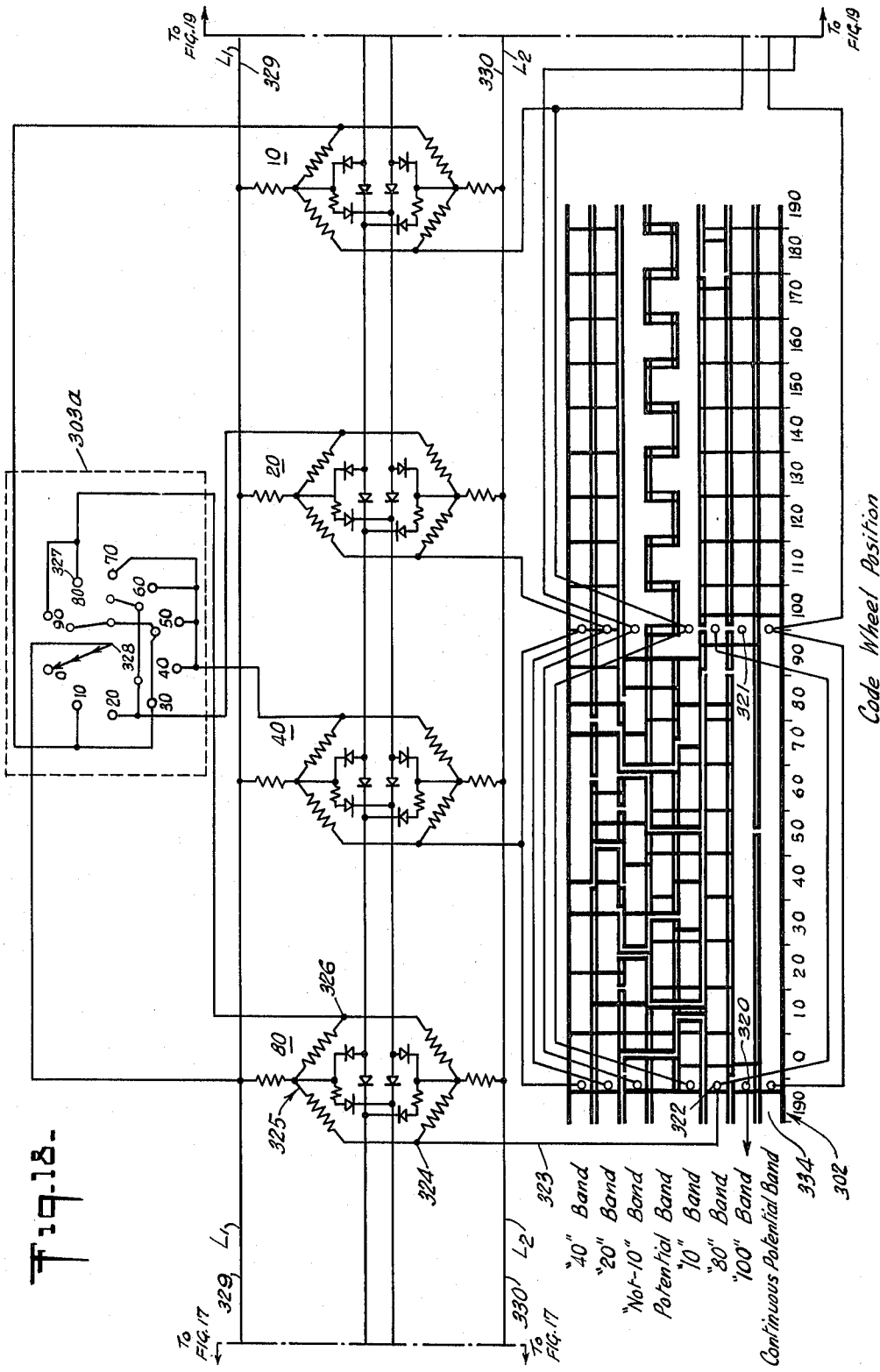

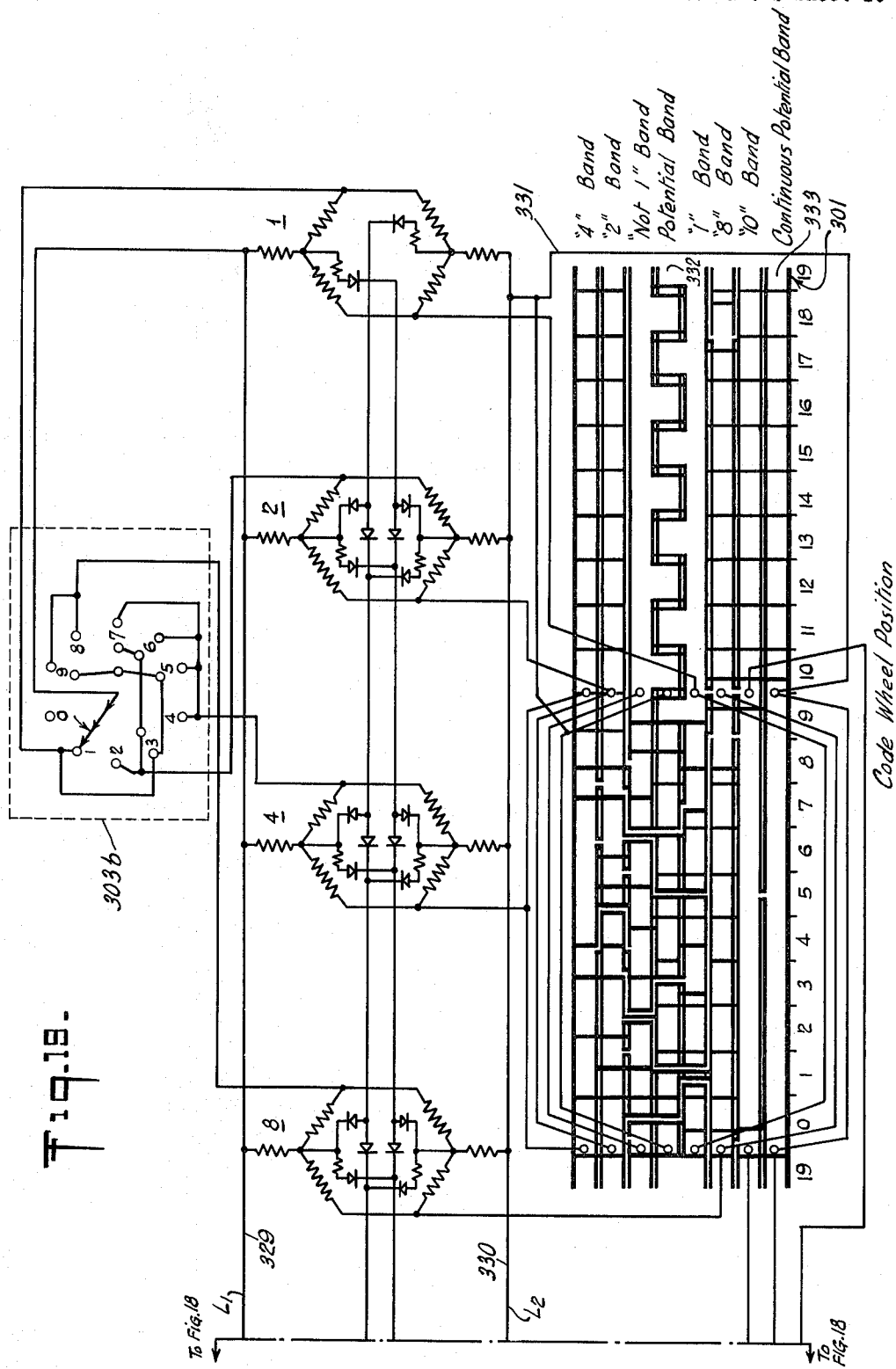

United States Patent Office 3,242,477
Patented Mar. 22, 1966

3,242,477
ANALOG-DIGITAL CONVERSION, COMPARING
AND CONTROL SYSTEM
Donald McL. Frothingham, 228 Brookside Road,
Darien, Conn.
Filed May 8, 1961, Ser. No. 108,361
39 Claims. (Cl. 340—347)

The present invention relates generally to improvements in analog-digital conversion, comparing and control systems and more particularly to a system for automatically controlling the position of a movable element such as the displacement of a shaft or the like.

Analog-digital conversion, comparing and control systems for the automatic control of shaft position entail the use of a digital encoder for translating the actual analog position of the shaft into digitally coded electrical impulses and thence feeding these electrical impulses into a comparator unit. Also fed into the comparator unit are digitally coded electrical impulses representing the desired shaft position. The comparator unit continuously compares the desired shaft position with the actual shaft position and produces an output voltage, operating means, usually a motor, to cause the shaft to move in a direction to assume the desired position. When the shaft reaches the desired position, no output voltage is produced, movement ceases and the shaft is stabilized in the desired position. Various systems to accomplish this have been known heretofore, one such complete system being described in Frothingham U.S. Letters Patent No. 2,852,764. A digital encoder comprising the portion of the system for the translation of angular displacement into coded electrical representations is described in Postman Patent No. 2,880,410. However, the systems heretofore known, including the digital encoding means, have necessitated the use of devices such as lead and lag brushes, slip rings and electro-mechanical relays involving many movings parts. As a result, prior art systems, or portions thereof, have been relatively expensive, complex and have inherent limitations in their speed of operation, flexibility and adaptability to various uses.

Accordingly, a principal object of the present invention has been to provide a novel, improved and relatively inexpensive system for accurately, efficiently and automatically controlling the position of a movable element.

Another object of the present invention has been to provide a novel and improved digital encoder for translating a shaft position into binary digital information.

A further object of the present invention has been to provide a self contained digital encoder capable of operating at high speeds without ambiguity.

Still another object of the invention has been to provide a novel and improved electronic comparator unit.

A further object of the invention has been to provide a simple system for converting analog information to digital form, comparing it with other digital information and producing an output responsive to the difference in digital information.

Yet a further object of the invention has been to provide a novel and improved means for controlling either the axial or angular disposition of a shaft.

Other objects of the invention will in part be obvious and will in part appear hereinafter.

In accordance with the invention, the system includes a digital encoder associated with a movable element, such as a shaft. The encoder is an electro-mechanical transducer comprising one or more code wheels each having thereon a plurality of circular bands containing a unique pattern of conducting and non-conducting segments and a network of interconnecting paths electrically connecting segments of different bands. Contacting the bands are two groups of aligned brushes which serve to apply a potential to the encoder, assist in the energization of particular segments for particular positions of the code wheel and produce a set of electrical indications in unique combinations, each combination being representative of an actual particular shaft position. The system also contains means for producing another set of electrical indications, manually or automatically, also in similar unique combinations, each being representative of a desired shaft position. An electronic comparator unit compares the two sets of electrical indications (i.e. the actual shaft position with the desired shaft position) and produces an output voltage representative of the difference between the two sets of electrical indications. The output voltage controls means which causes the shaft to assume the desired position.

For a fuller understanding of the nature and objects of the invention, reference should be had to the following detailed description taken in connection with the accompanying drawings in which:

FIG. 1 is a block diagram showing the major components of a complete analog-digital conversion, comparing and control system.

FIG. 2 is a block diagram showing the relative order of magnitude of four code wheels comprising a digital encoder.

FIG. 3 shows the developed surface of a simple code wheel.

FIG. 5 shows the developed surface of a code wheel having a potential applying band and energizing bands.

FIG. 6 shows the developed surface of two succeeding code wheels of different orders of magnitude and the interconnections therebetween.

FIGS. 7–9 show the developed surface of a code wheel, including the interconnections between segments, as the brushes change from one code position to another.

FIGS. 10–12 show the developed surface of a code wheel for the functioning of the potential transfer brushes.

FIG. 13 shows a partial elevational cross-section of the outer portion of a code wheel band.

FIG. 14 shows a block diagram of a comparator circuit.

FIG. 15 shows a schematic circuit diagram for a comparator.

Figure 4:
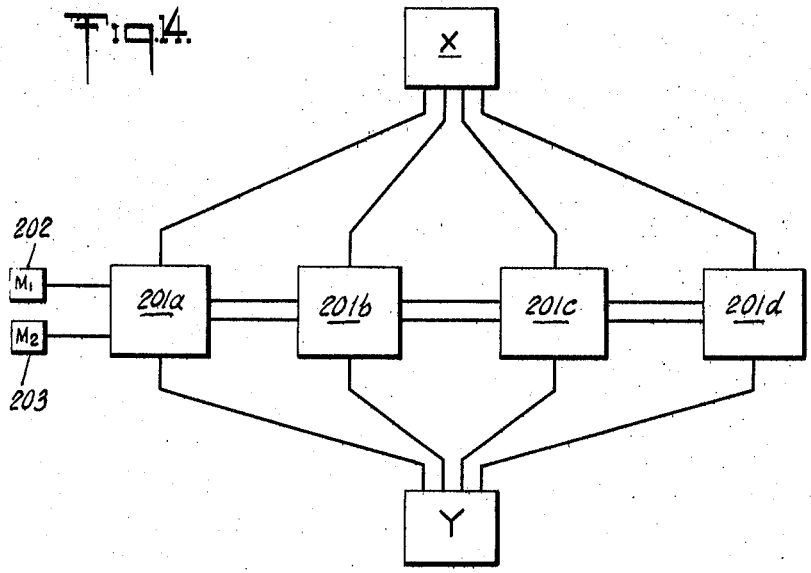
FIG. 4 shows the developed surface of a simple code wheel having a "not-1" band.

FIGS. 17–19 combined, show a complete analog-digital conversion, comparing and control system.

The position of a shaft capable of axial movement between two extremities, or the angular disposition of a rotatable element, may be identified arbitrarily by a number. Thus, for example, if the total movement of the shaft is divided into ten thousand individual positions, each position is capable of being identified by a distinct decimaly number between 0 and 9999.

Decimal numbers may be expressed in a binary digital form in accordance with the code defined in Table I.

TABLE I

| Decimal Number | Binary Code | | | |
|---|---|---|---|---|
| | 8 | 4 | 2 | 1 |
| 0 | 0 | 0 | 0 | 0 |
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |

The two symbols used in the table for the binary code are 0 and 1. When representing the code in electrical terminology, the two symbols are represented by the condition of a circuit. Thus, "0–1" are interchangeable respectively with such electrical expressions as "off-on," "open-closed," "deenergized-energized," and "non-conducting-conducting."

An examination of the foregoing table will show that, if desired, the combinations in the code may be varied to indicate sixteen decimal numbers, for example, between 0 and 15. When this is done, the code is referred to as a straight binary code. A binary code which is based on the use of the symbols to express only digits between 0 and 9, as is shown in Table I, is referred to as a decimal binary code. For the discussion hereinafter, only the decimal code will be used. It is understood, however, that the coding systems are interchangeable and either may be adapted for use in the invention.

In the decimal binary system the positional number 7999, for example, is represented as follows:

0111    1001    1001    1001
 (7)     (9)     (9)     (9)

If each binary digit is expressed by the condition of an electrical circuit, the number may be represented electrically. When the circuit is closed (on or energized), the binary digit representing that circuit may be said to be 1. When the circuit is open (off or deenergized), the digit representing that circuit may be said to be 0. Thus, four circuits are required to express each decimal digit of a number. To represent any number between 0 and 999, four groups of four circuits each are necessary. Similarly to represent any number between 0 and 99,999, five groups of four circuits each are necessary. It is thus possible to represent the position of any movable element such as the displacement of a shaft or the angular disposition of a rotatable element, by a corresponding number expressed in binary coded form and represented by the condition of groups of electrical circuits.

Referring now to FIG. 1, the complete analog-digital conversion, comparing and control system shown in block diagram includes a controlled element 10 which may be an element such as a shaft, wheel or disc and which is connected to a digital encoder 11. The encoder translates the actual position of the controlled element into set of electrical impulses, in binary digit form. Another set of electrical impulses, representing the desired position of the controlled element 10, is fed into the comparator unit 12 from the digital input 13. The digital input 13 may consist of a series of two condition devices having an open and a closed condition such as manually operated switches, a punched tape preset to feed in automatically information in binary digital form, or the like.

The comparator 12 continuously compares the information input from the digital input 13 with the information from the digital encoder 11 and produces an output, representative of the qualitative difference between the two sets of digital information. The output from the comparator 12 operates a controller 14 which causes the controlled element 10 to move in the direction of the desired position. As the controlled element 10 moves toward the desired position, the digital encoder 11 senses the changing position and instantaneously transmits new information in binary digit form to the comparator 12. This sequence of events continues at a high speed until the encoder 11 assumes a position having a digital readout which matches that of the digital input 11. At this point, comparator 12, no longer detects a difference between the settings of the digital input 13 and the information from the digital encoder 11, and comparator 12 ceases to produce an output. The controlled element 10 is then fixed in its desired position.

The digital encoder described herein is an electro-mechanical transducer consisting of one or more code wheels. Each code wheel may be in the form of a disc, drum or a device having a commutating surface or the like. One code wheel preferably is assigned to represent each decimal digit and therefore each code wheel has four electrical output circuits representing the decimal digit in binary digital code. If it is desired to represent numbers between 0 and 9999, then, as explained hereinbefore, four code wheels are required as shown in block diagram form in FIG. 2. Each code wheel represents a different order of magnitude of numbers. Thus code wheel 15 represents the ones units; code wheel 16 represents the tens units; code wheel 17 represents the hundreds units; and code wheel 18 represents the thousands units. The code wheels 15, 16, 17, 18 may be mechanically coupled to each other through driving means consisting of rotation reducing devices 19, 20 and 21, which may be gear trains, pulleys or any usual means for this purpose. Reduction in the speed of rotation for succeeding code wheels in a decimal binary system is in the ratio of ten to one. It should be noted that the most significant code wheel 18 which is the code wheel representing the highest order of magnitude, rotates one one-thousandth of a revolution for every complete cycle of the least significant code wheel 15, which is the code wheel representing the lowest order of magnitude. Similarly, less significant code wheels rotate ten times for each revolution of the next more significant code wheel.

An explanation of the code wheel of the invention will now be given by showing the development of a code wheel, the usual difficulties encountered and how they are solved by the concepts embodied in the invention.

In FIG. 3, there is shown the surface, in developed form, of a simple code wheel, for example, for the ones unit. The code wheel surface 30 is divided into ten transversely aligned stations or positions numbered from 0–9. The surface 30 is further divided into four circumferential information bands which are identified, for convenience, along the left hand side, as "1" band 30a, "2" band 30b, "4" band 30c and "8" band 30d. Thus each band is made up of a series of rectangular segments 31, the number of which, as shown in this illustration, is equal to the number of code wheel positions. Each segment is electrically separated from every other segment. Clear segments 32 are adapted to be deenergized or OFF. Vertically shaded segments 33 are adapted to be energized or ON. Transversely aligned digital information brushes preferably are fixed in position and contact respectively bands 1, 2, 4 and 8 and because of their association with the bands may be referred to, for convenience, as the "1" brush 34a, "2" brush 34b, "4" brush 34c and "8" brush 34d. The digital information brushes produce the readout or output of the encoder representing its actual position or angular disposition with respect to the brushes. As the code wheel rotates, the brushes contact different segments. Brushes contacting ON segments 33, become energized and brushes contacting OFF segments 32 become deenergized. Thus the brushes have a unique readout representative of the code wheel position which the brushes are contacting. The position of the brushes shown in FIG. 3 indicates that the "4" brush 34c and the "8" brush 34d, each contacting clear segments, are deenergized and the "1" brush 34a and the "2" brush 34b, each contacting shaded segments, are energized, thereby indicating code wheel position 3 or, as expressed in binary code, 0011. If there is any misalignment of brushes, such as, for example, shown exaggerated by the "2" brush 34b being at code wheel position 4 and indicated by a dotted circle 34e, an erroneous number 0001 or the decimal digit 1 is read instead of the correct number 0011 or 3. This demonstrates how if there is any misalignment of brushes, at the instant of change from one code wheel position to the next, an erroneous readout will be produced. Since each code wheel of FIG. 2 is turning one-tenth as much as the next less significant code wheel, when the least significant code wheel 15 turns one-tenth of a revolution i.e. one digit, the most significant code wheel 18 turns one-ten thousandth of a revolution. For such minute movements of the code wheel position, it cannot be expected that all brushes on all code wheels will cross from one segment to the next simultaneously. For example, moving from the number $$8000 = 1000 \ 0000 \ 0000 \ 0000$$
to
$$7999 = 0111 \ 1001 \ 1001 \ 1001$$

the least significant code wheel 15 turns $\frac{1}{10}$ of a revolution; the tens code wheel 16 turns $\frac{1}{100}$ of a revolution; the hundreds code wheel 17 turns $\frac{1}{1000}$ of a revolution and the most significant cote wheel 18 turns $\frac{1}{10,000}$ of a revolution. In turning that $\frac{1}{10,000}$ of a revolution, to provide an unambiguous reading, it is observed that all brushes on code wheel 18 must change from one segment to the next simultaneously. Moreover, on code wheel 18, that particular brush which was energized must cross to a segment which is deenergized and simultaneously those particular brushes which were deenergized must cross to energized segments. For such minute movements, it is improbable that the required changes would occur simultaneously and therefore the particular pattern of the encoder wheel surface shown in FIG. 3 could not avoid erroneous readings.

To effect the required simultaneous changeover in energization of brushes, a different code wheel pattern is necessitated.

FIG. 4 shows a code wheel 35 in developed form, provided with an additional band 36. The arrangement is such that the segments of the additional band 36 are energized when the segments of "1" band 30a are deenergized and vice versa. The additional band 36 may therefore be termed the "not-1" band since its segments are ON alternately with the segments of "1" band 30a for succeeding code wheel positions. A "not-1" brush 37 is aligned with the digital information brushes and adapted to contact the "not-1" band 36. Inspection of FIG. 4 shows the following:

(1) Segments of the "1" band 30a are always ON for an odd numbered code wheel positions and segments of the "not-1" band 36 are always ON for an even numbered code wheel position.

(2) When the brushes are moving relatively in the direction of increasing code wheel positions,
 (a) digital information brushes other than the "1" brush 34a, change from OFF to ON, at the same time that the "not-1" brush 37 changes from OFF to ON,
 (b) digital information brushes other than the "1" brush 34a, change from ON to OFF only at times when "1" brush 34a changes from ON to OFF.

(3) When the brushes are moving relatively in the direction of decreasing code wheel positions, the converse is true and,
 (a) digital information brushes other than the "1" brush 34a change from OFF to ON only at times when the "1" brush 34a changes from OFF to ON,
 (b) digital information brushes other than the "1" the brush 34a change from ON to OFF only at times when the "not-1" brush 36 changes from ON to OFF.

If, when the brushes are moving relatively in the direction of increasing code wheel positions, at the instant that the digital information brushes, other than the "1" brush 34a, which were due to change from OFF to ON, could be connected, by some means, to the "not-1" brush 37, those digital information brushes so connected would change simultaneously with the change in the "not-1" brush 37. Similarly, if at the instant that the digital information brushes, other than the "1" brush 34a, which were due to change from ON to OFF, were connected, by some means, to the "1" brush 34a, those digital information brushes so connected would change from ON to OFF simultaneously with the change in the "1" brush 34a If, when the brushes are moving relatively in the direction of decreasing code wheel positions at the instant that the digital information brushes, other than the "1" brush 34a, which were due to change from OFF to ON, could be connected, by some means, to the "1" brush 34a, those digital information brushes so connected would change simultaneously with the change in the "1" brush 34a. Similarly, if at the instant that the digital information brushes other than the "1" brush 34a which were due to change from ON to OFF, could be connected, by some means, to the "not-1" brush 37, those digital information brushes so connected would change simultaneously with the change in the "not-1" brush 37.

Since, for the arrangement just described, digital information brushes, other than the "1" brush 34a, become energized from the "1" brush 34a or the "not-1" brush, by being appropriately interconnected to those brushes, the "1" brush 34a and the "not-1" brush 37 may be characterized as energizing brushes. Similarly, since the brushes are associated with bands, the "1" band 30a and the "not-1" band 36 may be characterized as energizing bands. It should be noted that the "1" band 30a is both an energizing band and a digital information band and the "1" brush 34a is both an energizing brush and a digital information brush.

An arrangement such as that just described is shown in FIG. 5 omitting, however, a showing of the actual interconnections from the digital information brushes to the energizing brushes. In FIG. 5, it may be assumed that areas of bands which are vertically shaded are electrically connected to the "not-1" band 36 and areas of bands which are horizontally shaded are electrically connected to the "1" band 30a. Areas of bands shaded both horizontally and vertically are continuously energized. In accordance with the invention, an additional band has been added to code wheel surface 40 which may be termed the potential band 41 since it is adapted to be the source of energy applied to the code wheel. Potential brush 42, fixed in the aligned position with all other brushes, is connected at one end to a source of potential (connection not shown in FIG. 5), and at the other end contacts potential band 41 thereby applying potential to those segments contacted. Potential band 41 preferably is located between the "1" band 30a and the "not-1" band 36 and arranged electrically in a pattern of interdigitated castellations with the "1" band 30a and the "not-1" band 36. The interdigitated castellations being electrically separated from each other. The electrical separation of the interdigitated castellations is shown by the heavy black line 43. It is thus apparent that as potential brush 42 moves relatively from one segment to another along potential band 41, those segments which brush 42 contacts are energized and by means of the pattern of interdigitated castellations the "not-1" band 36 becomes energized when brush 42 contacts even numbered positions of the code wheel and the "1" band becomes energized when brush 42 contacts odd numbered positions of the code wheel. The "1" band 30a and the "not-1" band 36 are therefore energized in an alternating relationship, as are the "1" brush 34a and the "not-1" brush 37, with relative movement between the code wheel and the brushes.

As the brushes read ascending numbers, digital information brushes (except the "1" brush 34a) which are deenergized or OFF, but are required to go ON, for the next succeeding position, to provide the proper digital readout, are connected to the "not-1" brush 37. Similarly, digital information brushes which are ON, but are required to go OFF, for the next succeeding position, to provide the proper digital readout, are connected to the "1" brush 34a. By similar reasoning it is apparent that for brushes reading descending numbers, the ON's and OFF's are reversed. It is seen, however, that the interconnections between brushes remain the same for either ascending or descending numbers. Brushes which are ON and must remain ON for the next succeeding code wheel position, are connected in a manner to be continuously ON (not shown in FIG. 5). Brushes which are OFF and must remain OFF for the next succeeding code wheel position are connected in a manner to be continuously OFF. As will be seen in FIGS. 7–12, interconnections between the digital information brushes and the energizing brushes are made with the cooperation of interlacing paths and interconnected segments between bands.

Slight variations in alignment of brushes may be compensated for by connecting a portion of the segment preceding and adjacent to the segment whose electrical condition is required to be changed, to the proper energizing band. For example, a portion of the segment preceding and adjacent to a segment required to be energized for ascending numbers is connected to the "not-1" band 36. Since, under the conditions stated, the particular information brush and preceding segment are OFF, and since the "not-1" band 36 is also OFF at this moment, the readout will not be affected. As soon as the "not-1" band 36 goes ON due to the potential brush 42 moving onto a castellation energiziing the "not-1" band 36, simultaneously, the digital information brush required to be energized will go ON since, as arranged, it will be contacting a segment which has been electrically connected to the "not-1" band 36.

A specific example will show this more readily. When the brushes are in code wheel position 1 and moving relatively in an ascending direction, the pattern of interdigitated castellations energizes the "1" brush 34a. The "2," "4" and "8" brushes 34b–34d are contacting segments which are OFF. However, in code wheel position 2, the "2" brush 34b must be ON. Therefore, that portion of the "2" band 30b which is still in code wheel position 1 but adjacent to code wheel position 2, identified as segment 44, is electrically connected to the "not-1" band 36 which is, at this moment, still OFF. The vertical shading of segment 44 indicates it is electrically connected to the "not-1" band 36. Thus, simultaneously with the crossing by energizing brush 42 of the electrical separation 45, the "1" band 30a is deenergized, the "not-1" band 36 is energized, segment 44 is energized and the "2" brush 30b contacting segment 44 is energized, thereby indicating the correct digital readout. It should be noted that the change of the "2" brush 30b from OFF to ON occurred simultaneously with, and because of, the change from OFF to ON of the "not-1" brush 37 and there is no possibility of ambiguity arising from a slight misalignment of brushes.

As the brushes progress from code position 2 to code position 3, the "2" brush 34b which is ON must remain ON and the "1" brush 34a which is OFF must change to ON. Since the "2" brush 34b is contacting a segment which is electrically connected to the "not-1" brush 37, on further movement the "2" brush must be disconnected from that segment. This is accomplished by electrically disconnecting the "2" band 30b from the "not-1" band 36 by an electrical separation 46 at a location in code wheel position 2 of the "2" band 30b adjacent to the boundary line 47 between code wheel positions 2 and 3. The remainder of code position 2 in the "2" band 30b is a segment 48 which is continuously energized and extends over into a portion of code position 3 and consequently as the "2" brush 34b contacts segment 48 it remains ON for the entire code wheel position 2 and the initial portion of code wheel position 3. As the potential brush 42 passes from code wheel position 2 to code wheel position 3, the "1" brush 34a goes ON. Thus, when the brushes are in code wheel position 3, the "1" brush 34a and the "2" brush 34b are ON resulting in the proper readout for code wheel position 3 (0011).

As the brushes approach the boundary 49 between code wheel positions 3 and 4, the "2" brush 34b must be prepared to change from ON to OFF and the "4" brush 34d must be prepared to change from OFF to ON. Consequently, just prior to reaching the boundary 49 electrical separation 50 separates continuously energized segment 48 on band "2" from segment 51 which is electrically interconnected with the "1" brush 34a. Similarly segment 52 on the "4" band, straddling boundary 49 is electrically interconnected with the "not-1" brush 37. In FIG. 5, the brushes are shown in the position where the readout changes from 3 to 4 (0011 to 0100). Thus, as the potential brush 42 crosses boundary 49, the "1" brush 34a will go OFF as will also the "2" brush 34b and the "not-1" brush 37 will go ON as will also the "4" brush 34d. The "not-1" brush 37 per se, not being a digital information output brush, does not enter into the counting. The change from 0011 to 0100 will occur instantaneously and positively and it is evident that, unless there is a very serious misalignment of the brushes, no ambiguous number can be read out.

In like manner, the remainder of the code wheel bands may be arranged into segments which are properly interconnected to the "1" brush 34a and the "not-1" brush 37 such that, for ascending readings, the brushes which are deenergized and next required to be energized for a proper digital readout, contact segments electrically interconnected to the "not-1" brush 37 and brushes which are energized and next required to be deenergized contact segments electrically interconnected to the "1" brush 34a. It can be shown by similar reasoning that for descending readings, the interconnections between brushes are the same and therefore this arrangement of the code wheel pattern and brushes will provide a proper digital readout for either ascending or descending rotation. This completed developed pattern is shown in FIG. 5.

When more significant code wheels are utilized for representing numbers of a higher order of magnitude, the readouts of all code wheels must be coordinated so that all changes occur simultaneously. For example, when the least significant code wheel 15 of FIG. 2 changes from position 9 (1001) to the next higher position, which on the least significant code wheel 15 is 0 (0000), the tens code wheel 16 must change from 0 (0000) to 10 (0001) on its digital readout. This change must occur simultaneously notwithstanding the fact that code wheel 16 has rotated only $\frac{1}{100}$ of a revolution during the time that code wheel 15 has rotated $\frac{1}{10}$ of a revolution. It is apparent that this condition becomes more critical as more significant code wheels are added, since changes must take place at smaller and smaller movements of the code wheel. However, ambiguities may be avoided if the change takes place on the least significant code wheel (i.e. the code wheel which has the largest relative motion) and then transferred to the next most significant code wheel. This may be accomplished by spreading the ten code wheel positions over only one-half the circumference of the code wheel, duplicating the segmentation pattern for the other half of the code wheel and by adding two bands to the less significant code wheel, which, for the ones code wheel 15, may be conveniently termed the "10" band and the "not-10" band. For code wheels representing higher orders of magnitude, similar terms such as the "100" band and the "not-100" band may be used.

In FIG. 6, there is shown one such embodiment of a developed code wheel 61 adapted to form a "10" band 62 and a "not-10" band 63. The segmentation pattern shown in FIG. 5 is represented twice over the entire surface of code wheel 61 by duplicating it each 180° of the code wheel surface 61. The "10" band 62 and the "not-10" band 63 are each continuously ON over 180° of the code wheel surface but each is ON for different halves of the code wheel corresponding to the segmentation pattern for 10 code wheel positions. Transfer brushes 64 and 65 contacting the "10" band 62 and the "not-10" band 63 respectively, transfer the potential in alternating relationship for each ten code wheel positions, to energizing bands, the "10" band 66 and the "not-10" band 67, of the next most significant code wheel which, for the example given, would be the tens code wheel 68. It will be observed that potential band 69 on the tens code wheel 68, is no longer necessary; nor is the pattern of interdigitated castellations necessary since the alternate energizing of the "10" band 66 and the "not-10" band 67 as well as the alternate energizing of the energizing brushes for code wheel 68 results from the action of the next less significant code wheel 61. Therefore, the changes in energization of brushes on more significant code wheels take place because of and simultaneously with the change in energization on the least significant code wheel. In FIG. 6, however, and in subsequent drawings, the potential band, similar to 69 is shown on the code wheel surface merely for uniformity and convenience, but its presence, other than on the least significant code wheel does not play a part in the operation of the system. It should be noted however that a potential brush contacting potential band 69 is definitely undesirable since it may result in conflicting formations of the alternating energization of the "10" band and the "not-10" band resulting from the least significant code wheel changes.

The operation of the potential transfer bands will now be explained by showing the change from decimal number 9 to decimal number 10. When the brushes on the units code wheel 61 are aligned in code wheel position 9, the proper digital readout will be 1001. The brushes on the tens code wheel 68 will be in position 0 having its proper digital readout (0000). The "not-10" brush 65 on the units code wheel 61 is contacting an energized segment 80 and the "10" brush 64 is contacting a deenergized segment 81. Leads 82, 83 connect brushes 65 and 64 respectively to brushes 84 and 85 respectively contacting the "not-10" band 67 and the "10" band 66 on the tens code wheel 68. Therefore, on the tens code wheel 68, the "10" band 66 will be OFF and the "not-10" band 67 will be ON presenting the proper digital readout of 0 (0000).

As the brushes on code wheel 61 approach the changeover line 86 from code wheel position 9 to code wheel position 10, the "10" brush 64 contacts a segment 87 on the "10" band 62 which is electrically connected to the "not-1" band 36. Since the "not-1" band 36 is still OFF in code wheel position 9, there is no change as the "10" brush 64 moves onto segment 87. Similarly, the "not-10" brush 65 contacts segment 88 on the "not-10" band 63, which is electrically connected to the "1" band 30a on code wheel surface 61.

The instant that the "1" band 30a becomes deenergized and the "not-1" band 36 becomes energized as the brushes cross change-over line 86, the "10" brush 64 becomes energized and the "not-10" brush 65 becomes deenergized. Consequently, the "10" brush 85 on the tens code wheel 68, being ON, will energize the "10" band 66. The "not-10" brush 84 being OFF, will cause the "not-10" band 67 to be deenergized. Similarly, following the rotation by the units code wheel 61 of another ten code wheel positions, "not-10" brush 65 will be ON transferring potential through lead 82 and "not-10" brush 84 to "not-10" band 67 on code wheel 68. At the same instant "10" brush 64 will go OFF deenergizing lead 83, "10" brush 85 and "10" band 66 on code wheel 68.

Since the tens code wheel 68 rotates one-tenth as much as the units code wheel 61, it is apparent that for each succeeding 180° of rotation of the units code wheel 61, the tens code wheel 68 will move up one of its code wheel positions. Consequently, the "10" band 66 and the "not-10" band 67 will be energized alternately and function similarly to the "1" band 30a and the "not-1" band 36 of the units code wheel 61.

On code wheel 68, therefore, at the correct instant, the "10" band 66 will become energized and that code wheel will have the proper decimal digital readout of 10, or as expressed in binary digit form for that code wheel, 0001. The "10" band 66 of code wheel 68 will remain energized for 180° of rotation of the next least significant code wheel 61, at which time the "10" band 66 will become deenergized and the "not-10" band 67 will become energized. At that instant, the brushes on code wheel 68 will have changed over from a digital readout of 10 (0001) to a digital readout of 20 (0010).

It will be observed that the "10" band 62 and the "not-10" band 63 of code wheel 61, and the "100" band 89 and the "not-100" band 90 of code wheel 68, are potential transfer bands and on each code wheel they are identical except for a 180° space relationship. Therefore, one of the transfer bands on each code wheel could be eliminated by providing a second brush for the remaining transfer band, the two brushes being spaced approximately 180° apart. The two transfer brushes could still be termed the "10" brush and the "not-10" brush or the "100" brush and the "not-100" brush, as the case may be, since the action of the transfer brushes would be the same as heretofore described and since one transfer brush is always energized when the other is deenergized. This arrangement is shown in FIGS. 7–12 and will be further described hereinafter.

The means for making the interconnections, without the employment of external relays, between segments on the digital information bands and the energizing bands and connections for continuously energized segments will now be described.

It will be observed that if two sets of aligned brushes, spaced 180° apart, are arranged to contact the bands, except for the pair of transfer brushes, the pair of brushes contacting the same band may be connected together. The segments of the digital information bands pass under first one set of brushes and then the other set of brushes. When the pairs of brushes are thus interconnected, it is possible to have one-half the circumference of a digital information band either blank or unused for providing a digital information output, since for any particular position at least one set of the brushes is contacting the required digital information band segments. The energization pattern of segments may be formed on whichever half of the code wheel that is more convenient from a design standpoint.

Therefore, that area of the code wheel which is not employed to provide a digital information output, may be utilized to provide the electrical interconnections between segments of different bands, in a manner so as not to interfere with a proper digital readout. Such a pattern of segmentation and interconnecting paths cooperating with two sets of aligned brushes spaced approximately 180° apart, is shown in FIG. 7. In FIG. 7, arranged in interdigitated castellations are the "1" band 101, and the "not-1" band 102 and the potential band 103. In the preferred embodiment, these castellations are formed for only one-half the circumference of the code wheel 104, that being the right half in FIG. 7. The interconnections between segments of different bands pass through the other, or left, half of the code wheel. [In this design, except for the "1" band 101, one-half the surface of the digital information output bands have segments which are always completely separated from the energizing bands.] The segmentation is formed, as previously described, by separations 105, indicated in the drawing by heavy black lines. From the pattern of interdigitated castellations, it will be seen that the "1" band 101 and the "not-1" band 102 act as the energizing bands, which are themselves alternately energized for succeeding code wheel positions from potential band 103. The "1" brush 110 contacting the "1" band 101, and the "not-1" brush 111 contacting the "not-1" band 102 are each energized and deenergized correspondingly. Brush 110a, also contacting the "1" band 101, is fixed in position substantially 180° from brush 110 and the pair are electrically interconnected externally to the code wheel. Similarly, brush 111a is spaced 180° from and is electrically connected to brush 111. (Electrical connections between pairs of brushes are external and not shown in FIG. 7.) Energizing brushes 110a and 111a, which may be termed the "1" brush and "not-1" brush respectively, are utilized to energize segments which are interconnected by a network of conducting paths to other segments which are required to be energized.

FIGS. 7, 8 and 9 show the developed code wheel surface having the network of interlacing conductive paths and demonstrate how brushes of different bands are electrically interconnected as the digital output changes from 3 to 4 (0011 to 0100). In practice, the brushes are stationary and the code wheel rotates beneath them. However, it is only the relative movement between the code wheel and the brushes that is significant and for the purposes of this discussion it will be assumed that the brushes are moving relatively towards increasing code wheel positions (left to right). In the drawings, for ease of illustration, the circuit which the brushes are leaving is cross-hatched to the left (from bottom to top) and the circuit which the brushes are about to contact is cross-hatched to the right.

Additional continuous potential band 120 is provided on code wheel surface 104 to supply a continuous potential for those segments required to be continually energized regardless of the code wheel position. In FIG. 7, the condition of the brushes is shown just prior to the change from code wheel position 3 to 4. The "2" brush 121 is just leaving a segment 122 connected, through interlacing path 123, to continuous potential band 120. Thus, the "2" brush 121 is energized. The "1" brush 110 is also energized since it is contacting the "1" band 101 which is energized from potential band 103. The pair of "8" brushes 124 and 124a and the pair of "4" brushes 125 and 125a are contacting deenergized segments. Therefore, the digital readout is 3 (0011). The "2" brush 121 is about to enter a segment 126 connected by an interlacing path 127 to the "1" brush 110a which, prior to the change of code wheel positions, is ON. The "4" brush 125 is about to contact a segment 128 connected, through an interlacing path 129, to the "not-1" segment 130, which, prior to the change of code wheel positions, is OFF.

In FIG. 8, the condition of the brushes is shown at the instant of changeover from code wheel position 3 to 4. The "2" brush 121 is on a segment 126 connected to the "1" brush 110a which has just gone OFF and the "4" brush 125 is on a segment 128 connected to the "not-1" brush 111a which is about to go ON.

In FIG. 9, the change from code wheel position 3 to position 4 is complete. The "4" brush 125 is leaving a segment 128 connected to the "not-1" brush 111a, which is on, and is about to enter a segment 131 connected, through interlacing path 132, to continuous potential band 120. The "2" brush 121 is about to leave a segment 126 which is connected to the "1" brush 110a, which is OFF, and is about to enter a deenergized segment 133. It will thus be seen that the digital readout is 4 (0100). Similar drawings and a like analysis may be made to show the change of binary digits for all code wheel positions.

FIGS. 10, 11 and 12 demonstrate the change occurring in the potential transfer brushes which transfer the potential from one code wheel to the next most significant code wheel. In FIG. 10, the condition of the brushes is shown for code wheel position 9 (1001). Transfer brush 141 is leaving a separated segment 142 and entering a segment 143 connected, through interlacing path 144, to a "not-1" segment 145, which is OFF. Transfer brush 146 is ON and is leaving a segment 147 connected to continuous potential band 120 and entering a segment 148 connected to the "1" brush 110, which is ON.

In FIG. 11, the instantaneous condition of the brushes is shown at the moment of changeover from code wheel position 9 (1001) to code wheel position 0 (0000). Potential brush 149 has just left code wheel position 9, and is about to enter code wheel position 0 which will energize the "not-1" band 102 and its brushes. Transfer brush 141 is on a segment 143 connected to the "not-1" brush 111a and is, with the change of potential brush 149, about to go ON, thereby energizing the "10" band of the next most significant code wheel (not shown). Transfer brush 146 is on a segment 148 connected to the "1" brush 110 which has just gone OFF and therefore the "not-10" brush on the next most significant code wheel (not shown) has gone OFF simultaneously. In FIG. 12, the instantaneous condition of the brushes is shown for code wheel position 0 (0000). Transfer brush 141 is leaving segment 143 connected to the "not-1" brush 111a which is ON and entering a segment 147 which is connected to the continuous potential band 120. The transfer brush 146 is leaving a segment 148 connected to the "1" brush 110 which is OFF and about to enter a separated segment 150. Thus the changeover from "not-10" to "10" is accomplished.

It is thus seen that the combination of the pattern of segmentation, interlacing paths and the two sets of aligned brushes effect the required digital readout without ambiguity and without any possibility of error. The design of the code wheel and its cooperating parts are such that brushes which are OFF but which are required to go ON with the next change in code wheel position are preliminarily arranged, before the change in position, to move onto a segment connected to the energizing brush which is OFF but will go ON with the change in code wheel position. The brushes which are ON but which are required to go OFF with the next change in code wheel position are preliminarily arranged, before the change in position, to move onto a segment connected to the energizing brush which is ON but will go OFF with the change in code wheel position. Thus with the instantaneous change from one position to the next, the brushes which must change, do so.

Brushes which are ON and which are required to remain ON for the next succeeding code wheel position are preliminarily, before the change in code wheel position, arranged to move onto a segment connected to a continuous potential band so that the change in code wheel position does not affect these brushes. Brushes which are OFF and required to remain OFF during the next succeeding change in code wheel position are preliminarily, before the change in code wheel position, arranged to contact completely separated segments so that they are unaffected by the change in energization of the energizing bands.

During the changeover period then, all conditions are provided for and all changes which occur originate with the single change in the eneregization of the energizing brushes.

The above has described the logic of counting by a binary decimal code utilizing code wheels. The same is of course true for straight binary or other binary coding. In straight binary, the "1" and "not-1" concept is employed as it is for the binary decimal code. When the most significant number has been reached on the code wheel, i.e. 8 or 16 etc., it is necesary to transfer to the next significant code wheel, the concept of "8" and "not-8" or "16" and "not-16" etc., which would take the place of the "1" and "not-1" bands on the more significant code wheels.

In FIG. 13, there is shown an elevational cross-section of the preferred embodiment of the outer portion of the potential band forming the interdigitated castellations on a code wheel. It shows the electrical separation of segments and a brush 161 which contacts the surface of the band. The separation of two adjacent segments preferably is effected by a gap 162 in the surface of the band between the two segments. In the potential band forming the interdigitated castellations a completely separated or an insulated segment 163 preferably is provided between the two segments 164 and 165, the segments corresponding to different code wheel positions. Segments 163, 164 and 165 are composed of a conductive material. The gap 162 between segments is of a width that is smaller than the width of the surface of the brush 161 contacting the band so that the brush 161 will bridge the gap 162. Bridging of the gap is desirable for mechanical reasons as well as in order to preclude any instantaneous discontinuity in the energization of brushes. Except for substantially that portion of the code wheel having the interdigitated castellations, the gaps comprising the separation between segments do not occur at the boundary lines between code wheel positions. Therefore, the bridging of a gap by a brush does not cause erroneous readings since adjacent segments which are being bridged by a brush are always both OFF or both ON.

Actual changes in energization from one code wheel position to another originate with the change in energization resulting from the pattern of interdigitated castellations. Since for practical applications, it cannot be expected that energization of one segment will go OFF at precisely the same instant that the adjacent segment goes ON, it is preferable to build into the code wheel a pattern providing for a moment when the brushes are between code wheel positions and neither segment is ON. This is accomplished by making the width of the surface of the brush 161 contacting the surface of the potential band slightly less than the width of the total separation between segments 164 and 165. Therefore, at the instant that the brush 161 is over the insulated segment 163, neither segment 164 or 165 will be energized. For high speeds of the code wheel, the momentary null readout will have no effect on the operation of the encoder. At lower speeds, or when the encoder may be "creeping" towards its position, the null readout will be essentially the same as a lower reading, thereby causing the brushes to move relative to the code wheel in an ascending direction. Since, the system may be arranged so that the code wheels always creep into the desired position from a lower to a higher readout, the momentary null, caused by the brush being over the insulated segment, will not adversely affect the operation of the encoder. If it is desired that the encoder creep into position from a higher to a lower readout, the separation between the potential band segments forming the interdigitated castellations may be smaller than the width of the brush, thereby causing a momentary bridging of the segments.

An inspection of the code wheel surface in FIGS. 7 through 12 shows that certain portions of bands are constantly deenergized. Although theoretically unnecessary, it is preferable to divide these areas into smaller segments to minimize the danger of short circuiting brushes. In this way, if a particle of dust or other short circuiting means falls across the surface of one segment which is OFF and another which is ON, only a small portion of the band would be short circuited. For the same reason, it may be preferable to separate the energizing bands forming the interdigitated castellations into electrically separated segments, as is shown in FIGS. 7-12 by electrical separations 151. There is thus less danger of an erroneous readout resulting from possible short circuits.

For code wheels of a higher order of magnitude than the least significant code wheel, the application of the potential to the energizing bands originates from the transfer bands of the next least significant code wheel. Consequently, the potential band corresponding to band 69 in FIG. 6 and the pattern of interdigitated castellations is unnecessary for code wheels other than the least significant code wheel. Similarly, the brushes contacting the potential band 69 are also unnecessary, and in fact, are undesirable for the effective operation of the system. However, for purposes of uniformity in the manufacture of the code wheels, and for interchangeability and standardization of parts, the potential band 69 may be included.

The digital output produced by the encoder consists of a plurality of electrical indications in unique combinations each representative in binary digital code digits of a number identifying an actual discrete disposition of the encoder corresponding to the position of a movable element such as the angular or the axial displacement of a shaft. Comparison of that number with the number representing the desired position of the element will determine whether the element must be moved in one direction or another in order to assume the desired position. Accordingly, the invention includes a comparator unit which is capable of comparing the digital information output from an encoder with another set of digital information in binary coded form representing the desired position of the element, determining in which direction the element must be moved and causing a controller to move the element to that desired position.

In FIG. 14, there is shown a block diagram of a comparator circuit. The binary coded number representing the desired position of the element is denoted "X" and the binary coded number of the actual position of the element, such as, for instance, determined by an encoder, is denoted "Y." The two numbers are fed into the comparator which contains individual bridge circuits for comparing each of the corresponding binary digits in the numbers to be compared. The left-hand network 201a compares the most significant binary digit. Less significant binary digits are compared separately by the additional networks 201b, 201c and 201d. Depending on which number, "X" or "Y," is greater, an impulse will be produced in one of two controller devices 202 and 203. The controller devices may be employed to indicate which number is greater or whether the numbers are matched. They may also be employed to control the apparatus from which the binary coded number "Y" is derived in a manner to cause that apparatus to move in a direction so that "Y" will approach "X."

An illustration will show how this occurs. Suppose the output of a digital encoder may be indicating the number 5,000 and suppose it is desired that the encoder assume the position 7,375. The latter number may be fed into the comparator in binary code by switches or other means. Thus the two numbers expressed in binary coded decimal form would be as follows:

```
    a b c d  e f g h  i j k l  m n o p
X = 0 1 1 1  0 0 1 1  0 1 1 1  0 1 0 1  (7375)
Y = 0 1 0 1  0 0 0 0  0 0 0 0  0 0 0 0  (5000)
```

The comparator instantly recognizes that the most significant pair of binary digits in column a above is already matched as is the second pair in column b above; each of the digits comprising the first pair being OFF and each of the digits comprising the second pair being ON. The pair of digits in column c however, is unmatched, "X" being ON and "Y" being OFF. Therefore, the binary code indicates that the number "X" is greater than the number "Y." Consequently, the comparator produces an output voltage which causes the controller to move the controlled element in a manner such that the encoder changes its position to indicate increasing numbers. This change in position continues until the pair of digits in column c is matched. At this instant, the digital encoder will have assumed position 6,000 and the condition of the numbers expressed in binary coded form is as follows:

```
        a b c d   e f g h   i j k l   m n o p
X  = 0 1 1 1   0 0 1 1   0 1 1 1   0 1 0 1   (7375)
Y₁ = 0 1 1 0   0 0 0 0   0 0 0 0   0 0 0 0   (6000)
```

In this condition, the pair of digits in column d is unmatched and indicates that "X" is still a greater number than "Y₁." Consequently, the controller will continue to cause the controlled element to move in the same direction. When the output of the encoder indicates 7,000,

```
        a b c d   e f g h   i j k l   m n o p
X  = 0 1 1 1   0 0 1 1   0 1 1 1   0 1 0 1   (7375)
Y₂ = 0 1 1 1   0 0 0 0   0 0 0 0   0 0 0 0   (7000)
``` it is noted that all pairs of digits from columns a to f are matched and so control passes instantly to the unmatched pair of digits in column g. The unmatched condition of the digits in column g indicates that "X" is still the larger number and the controller would therefore continue to cause the encoder to move in an ascending direction. This successive matching of binary digits from the most to the least significant continues until all digits are matched, at which point there is no output impulse from the comparator and movement of the controlled element and its associated encoder would be stopped in the balanced position.

If the desired position of the element were to be 8,000 and the actual position of the element were to be 7,777, the information fed to the comparator circuit in binary decimal code would be as follows:

```
        a b c d   e f g h   i j k l   m n o p
X₁ = 1 0 0 0   0 0 0 0   0 0 0 0   0 0 0 0   (8000)
Y₃ = 0 1 1 1   0 1 1 1   0 1 1 1   0 1 1 1   (7777)
```

Here it is seen that the unmatched condition of the first pair of digits in column a tends to cause the comparator to produce an output which will move the element in a direction to indicate ascending numbers. However, most of the remaining pairs of digits are unbalanced in the reverse manner thereby tending to cause the comparator to produce an output which would require the element to move in a direction to indicate descending numbers. Hence, for the proper operation of the comparator circuit it is necessary that all pairs of binary digits be compared only after more significant pairs of digits are matched.

From the above description, it is possible to summarize the requirements of the comparator unit as follows:

(1) Unmatched pairs of binary digits must cause the comparator to produce an output on either of two leads depending on which binary digit of the pair is ON.

(2) Matched pairs must not interfere with the comparison of less significant pairs which are unmatched.

(3) Pairs of binary digits must be compared sequentially from the most to the least significant.

(4) The outputs caused by unmatched pairs of less significant binary digits tending to produce a conflicting pulse must be nullified so as not to interfere with the comparison of more significant pairs which are unmatched.

FIG. 15 shows a comparator circuit which accomplishes the four requirements stated above. The circuit shown has a plurality of impedance bridge networks, each of which compares the relative condition of a pair of binary digits. Thus, there are as many bridge networks as there are pairs of binary digits to be compared. In FIG. 15, since two bridge circuits are shown, two pairs of binary digits may be compared. Additional pairs of binary digits may be compared by adding additional impedance bridge circuits.

The condition of the binary digit may be represented by the condition of a two condition device or element such as a switch. By the term two condition device or two condition element, I mean an electrical device capable of being in either of two conditions such as an open condition and a closed condition or, a deenergized condition and an energized condition. Therefore, two condition devices include thyratrons, tubes, relays and semiconductors which may also be adapted to represent the condition of the binary digits. However, for convenience in the discussion hereinafter the two condition device will be referred to as a switch. Thus, when the switch is closed, the digital representation is "1" or ON. When the switch is open, the digital representation is "0" or OFF. From this, it is obvious that the comparator circuit is also capable of comparing the relative condition of switches, tubes, diodes, relays, circuits and other two condition elements and it is not intended that the scope of the invention be limited to comparison of binary digits.

It will be seen that a pair of two condition elements may be compared by the comparator circuit hereinafter described. The output of the comparator circuit provides an indication of the relative condition of the pair of two condition elements, indicating whether the two condition elements comprising the pair are matched or unmatched, and if unmatched, the comparator circuit indicates the nature of the mismatch.

In accordance with the invention, an impedance bridge network having two major and two intermediate apices, is connected between first and second voltage source terminals which are of opposite polarity. The impedance elements of the bridge network preferably are equal resistances connected between adjacent apices. The connections to the first and second voltage terminals are from the major apices through an impedance, preferably a resistance. The first two condition element is connected between the first voltage terminal and one intermediate apex of the bridge and the second two condition element is connected between the second voltage terminal and the opposite intermediate apex. Accordingly, it will be seen that if the first two condition element is closed and the second two condition element is open a positive pulse is formed at one major apex of the bridge circuit during the time that the first terminal is positive. Correspondingly, if the first two condition element is open and the second two condition element is closed, a positive pulse is formed at the opposite major apex of the bridge circuit during the time that the second terminal is positive. The positive pulse may be brought out from the major apices by first and second pulse lines connected thereto and thereafter the pulse lines may be connected to means responsive to the positive pulses. The concatenation of events comprising (a) the positive pulse in a specific pulse line and (b) a specific voltage terminal being positive, when a specific unmatched condition occurs in the pair of two condition elements being compared, may be adapted to indicate the nature of that specific unmatched condition.

A particular circuit comprising the preferred embodiment of the invention will now be described in detail.

In the comparator circuit, shown in FIG. 15, which may be used, for example, in conjunction with the control of a movable controlled element, switches 210a and 210b represent the binary coded number corresponding to the desired position of the controlled element. Switches 211a and 211b represent in binary code the actual position of the controlled element as indicated preferably by the brushes from a digital encoder. In the drawing and explanation herein, only two binary digits are shown comprising the number. However, as many digits as are necessary to comprise any number, may be connected into the comparator circuit by adding additional bridge circuits. Switches 210a and 211a represent the first pair of binary digits to be compared and switches 210b and 211b represent the second pair of binary digits to be compared.

In the preferred embodiment of the invention, an alternating voltage source is applied to terminals 212 and 213 leading to the primary coil of a transformer 214. The output terminals 215 and 216 of the transformer apply an alternating voltage to the comparator circuit. The center tap 217 of the secondary coil of transformer 214 is connected to ground. Accordingly, output terminals 215 and 216 are of opposite polarity and each may be regarded as having alternating voltage V with respect to ground. It should be noted, however, that other circuit configurations, not using center tap or ground connections, may be adapted to provide a two terminal alternating source voltage for the comparator circuit without departing from the principles of my invention.

The alternating output voltage from transformer 214 is applied to each impedance bridge network for comparing the pairs of binary digits. Construction and circuitry of each impedance bridge network is identical. The first impedance bridge network, comparing the most significant pair of binary digits has two major apices 230 and 231 and two intermediate apices 232 and 233, with impedances being connected between adjacent apices. In the preferred embodiment of the invention, the impedances consist of equal resistances $r$. Major apex 230 is connected through a resistance R to one voltage lead 236 which may be denoted $L_1$. The opposite major apex 231 is connected through an equal resistance R to the opposite voltage lead 237 which may be denoted $L_2$. Switch 210a is connected between line $L_1$ 236 and intermediate apex 232, and switch 211a, which is being compared with switch 210a, is connected between line $L_2$ 237 and intermediate apex 233. Pulses forming at major apices 230 and 231 comprise the output of the bridge circuit. Major apex 231 is connected through a resistance 238 in series with a unidirectionally conductive device 239 to a lead 240 connected to a triggering device 241. In like manner, the opposite major apex 230 is connected through a resistance 242 in series with a unidirectionally conductive device 243 to a lead 244 connected to a triggering device 245. Resistances 238 and 242 may be equal and referred to as pulse resistances $r_p$. The unidirectionally conductive devices 239 and 243 preferably are semiconductor devices such as silicon diodes and germanium diodes. The triggering devices 241 and 245 preferably may be thyratron tubes or other well known unidirectionally conductive means including vacuum tubes and semiconductors capable of being triggered by a positive pulse. The term "trigger" is used in its broad sense and is intended to include a circuit closing, firing, current releasing or resistance reducing operation depending on the nature of the triggering device being employed. Between the anode 251 of thyratron tube 241 and one potential lead $L_1$ 236 there is connected one controller 252 being operated by the comparator circuit. The other controller 253 is connected between the anode 254 of thyratron tube 245 and the opposite voltage lead $L_2$ 237. Cathodes 255 and 256 of the thyratron tubes are each grounded. From the connections, it is apparent that the thyratron tubes are in condition to be triggered only during that half cycle when a plate goes positive with respect to ground. Each thyratron tube is biased negatively by connecting grid 257 of thyratron 241 to line $L_2$ 237 through grid resistor 259. Similarly, grid 258 of thyratron 245 is connected to line $L_1$ 236 through grid resistor 260. Grid resistors 259 and 260 may be equal and are termed $r_g$. Thus, during that half cycle when the anode goes positive, placing the thyratron tube in condition to conduct, the thyratron can not conduct unless a positive pulse appears at its grid.

The grid 257 of thyratron 241 is also connected to the output of major apex 231 through pulse line 240, diode 239 and resistor 238, so that a positive pulse formed at the major apex 231 may be sufficient to overcome the normal negative bias of thyratron 241 and to cause the tube to conduct if that positive pulse occurs during the half cycle when line $L_1$ 236 is positive. Similarly, during the half cycle when $L_2$ 237 is positive, thyratron tube 245 will conduct if a positive pulse is formed at major apex 230 connected through resistor 242, diode 243 and lead 244 to the grid 258 of thyratron 245. During the half cycles when the anode of a thyratron tube goes negative, the tube is incapable of conducting irrespective of the polarity of the pulse formed at its grid.

Considering only the first bridge network for comparing the most significant binary digits, when the switches 210a and 211a are in a matched condition, that is, either both switches are closed or both are open, it can be shown that the voltages with respect to ground at each major apex are equal and opposite, and may be stated according to the following formulas:

*Matched condition*

$$V_{231} = -V\left(\frac{k}{2+k}\right)$$

$$V_{230} = +V\left(\frac{k}{2+k}\right)$$

where $V_{231}$ is the voltage at major apex 231, $V_{230}$ is the voltage at major apex 230, V is the voltage of $L_1$ 236 above the center tap or ground, and $k$ equals $r/R$.

When switches 210a and 211a are in matched condition, neither thyratron tube will conduct. During the half cycles when the anode 251 of thyratron tube 241 is positive, the grid is biased negatively and only negative polarity pulses form at the major apex 231. Therefore thyratron tube 241 does not fire. During half cycles when the anode 254 of thyratron tube 245 is positive, the grid 258 of that tube is biased negatively and only negative polarity pulses form at the major apex 230. Therefore thyratron tube 245 does not fire.

When switches 210a and 211a are in the unmatched condition, the bridge network is unbalanced. Assuming the unmatched condition switch 210a is closed and switch 211a is open, it can be shown that the voltage at major apex 231 during the half cycle when $L_1$ is positive is:

*Unmatched condition*

$L_1$ positive:

$$V_{231} = +V\left[\frac{2-k^2}{(1+k)(2+k)}\right]$$

Under these circumstances, it is seen that a positive pulse appears at major apex 231. This positive pulse is applied through resistance 238 and pulse diode 239 to the grid 257 of thyratron tube 241. If the pulse is sufficiently large to overcome the negative bias of the thyratron 241, that tube will fire. From the equation, it is apparent that to provide the required positive pulse to overcome the negative bias of thyratron tube 241, $k$ must be a number that is less than the square root of two and it is preferred that $k$ is a number less than 1. Since the thyratron tube 245 is not capable of conducting during the half cycle when $L_1$ is positive, the comparator circuit will have energized controller 252 thereby indicating that switch 210a is closed and switch 211a is open.

During the next half of the cycle, thyratron tube 241 ceases to conduct since its anode 251 goes negative. Thyratron tube 245 will be in condition to conduct since its anode 254 is positive. However, it can be shown that during this half cycle, under the conditions stated, the voltage formed at major apex 230 is negative with respect to ground. Consequently, in the absence of a positive pulse at the grid 258, thyratron tube 245 does not conduct since it is biased negatively. Therefore, for the unmatched condition, switch 210a being closed and switch 211a being open, only thyratron tube 241 will conduct on alternate half cycles. Through the employment of suitable circuits such as resistance-capacitance networks, energization of controller 252 may be maintained for the full cycle.

By similar reasoning, it can be shown that only thyratron tube 245 will conduct when switch 211a is closed and switch 210a is open. Thus, the comparator circuit provides a means for comparing and indicating the relative condition of the switches. By connecting the controller to means which operate the switches, the condition of the switches may be controled so they match.

For the comparison of additional pairs of binary digits, additional impedance bridge networks are necessary. FIG. 15 includes a second impedance bridge circuit for the comparison of the next less significant pair of binary digits 210b and 211b. The second impedance bridge circuit is identical with the one previously described and has two major apices 270 and 271 and two minor apices 272 and 273, with resistance $r$ connected between adjacent apices. Each of the major apices is coupled through a separate resistor R to opposite alternating voltage sources $L_1$ 236 and $L_2$ 237. The output of major apex 271 is coupled through pulse resistance 278 and pulse diode 279 to pulse line 280. In like manner, major apex 270 is coupled through pulse resistance 282 and pulse diode 283 to pulse line 284.

Analysis of the operation of each bridge circuit is the same as for the bridge circuit heretofore described. Thus, for the unmatched condition of switches 210b and 211b, a positive pulse is formed at a particular major apex during one half of the cycle, representative of the unmatched condition.

Pulse line 280 connects the output of major apex 271 to the grid 257 of thyratron tube 241 through unidirectionally conductive means 285 which preferably is a semiconductor device, and line 240. Semiconductor device 285 may be a diode, connected in series with pulse lines 280 and 240 to assure that positive pulses formed at the major apices are fed to the grid of the thyratron tubes and are not drained by flow in other parallel circuits. Pulse line 280 is also connected at junction 286 to major apex 230 of the bridge circuit comparing the next most significant binary digits through unidirectionally conductive means 287 which preferably is a semiconductor device and may here be termed a drain diode. Similarly, pulse line 284 feeds the output of major apex 270 to the grid 258 of thyratron tube 245 through series diode 288. Pulse line 284 is also connected at junction 289 through drain diode 290 to major apex 231 of the bridge circuit comparing the next most significant binary digits.

When the most significant pair of binary digits is matched, the output at the major apices 230 and 231 of impedance bridge circuit comparing these binary digits will not fire either thyratron tube 241 or 245. However, if the next least significant pair of binary digits is unmatched, the pulse lines 280 and 284 and series diodes 285 and 288, forming a coupling circuit, allow the pulse output at the major apices 270 and 271 to be fed through to the grids of thyratron tubes 241 and 245 without appreciable impairment. Thus, the thyratron tubes will fire in accordance with the analysis heretofore made and in response to the most significant pair of unmatched binary digits.

If, however, a more significant pair of binary digits is not matched, conflicting pulses from bridge circuits comparing less significant binary digits must be drained or nullified so as not to cause the firing of both thyratrons thereby providing an ambiguous output.

An analysis of the circuit in FIG. 15 will show how draining of pulses from circuits comparing less significant unmatched binary digits when more significant binary digits are yet unmatched, is accomplished.

Assume the condition that switch 210a is closed and switch 211a is open, thereby causing the most significant bridge circuit to be unbalanced. During the half cycle when $L_1$ 236 is positive, a positive voltage will appear at major apex 231 which will cause thyratron tube 241 to fire. Positive pulses being fed through from less significant unbalanced bridge circuits on pulse line 280 can only have a strengthening effect on the condition of thyratron tube 241 which is already triggered by the positive pulse from apex 231. During the same half cycle, the plate 254 of thyratron tube 245 is connected to a negative voltage at line $L_2$ 237 and therefore thyratron tube 245 cannot be fired regardless of pulses formed on pulse line 244 or those originating from less significant bridge circuits.

During the succeeding half cycle, thyratron tube 245 is in condition to fire in the event a positive pulse appears at its grid 258. However, the assumed condition requires that only thyratron tube 241 fire on alternate half cycles. A positive pulse which may be formed on pulse line 284 due to switch 211b being closed and switch 210b being open, must be drained by drain diode 290.

As a positive pulse travels from major apex 270, towards the grid of thyratron tube 245, it must pass junction 289. If the voltage at junction 289 exceeds the voltage at major apex 231, drain diode 290 will conduct, thereby reducing the value of the voltage at junction 289 to that at the major apex 231. This will occur since the voltage at major apex 231 during this half cycle is negative with respect to the voltage at junction 289. Therefore, pulse diode 283 and drain diode 290 will conduct. When the diodes conduct, the voltage drop across the diodes are small compared to the voltage drop across pulse resistance 282. The value of pulse resistance $r_p$ 282 is selected to be relatively large with respect to the value of resistance $r$ so that substantially all of the voltage drop occurring in this circuit is across pulse resistance 282. Thus, the voltage at junction 289 is substantially the negative voltage at major apex 231. Negatively biased thyratron tube 245 will, therefore, be incapable of firing. Thus, pulses from the output of major apices of bridge circuits comparing less significant pairs of binary digits are drained by the bridge circuit comparing a more significant unmatched pair of binary digits.

It will be observed that when a large plurality of pairs of binary digits are being compared, the number of networks, and hence the number of pulse resistors forming parallel circuits increases. With an increasing number of parallel circuits, the equivalent resistance of the parallel circuits decreases and the voltage drop across the parallel pulse resistors decreases. This causes the voltage to rise at the major apex at which draining is in process. Accordingly, if a large number of networks tending to fire one thyratron tube are being drained by one major apex, for example, major apex 231, the voltage at major apex 231 can increase sufficiently to fire thyratron tube 245 regardless of the drain. However, this undesirable condition may be avoided by increasing the resistance of the pulse resistor $r_p$ to a sufficiently large volume. In this way, the equivalent resistance of the parallel networks can be increased so that the value of that resistance will still be relatively large. It would therefore be possible to drain the pulses from a large number of networks without causing the voltage at major apex 231 to rise to a level where it might fire thyratron tube 245.

In this manner, it is possible to select the proper value for the pulse resistor depending on the number of bridge networks in the circuit. It is also evident that this arrangement of drain diodes and pulse resistors will nullify the positive voltage pulses caused by bridge circuits comparing less significant binary digits when more significant binary digits are unmatched.

When the more significant pair of binary digits is matched, it is important that positive firing pulses originating from bridge circuits comparing less significant unmatched pairs of binary digits, be passed without being drained. Hence, for the example given, if switches 210a and 211a are matched, the voltage at junction 289 must be less than the voltage at major apex 231 during the half cycle during which there is a positive pulse in pulse line 284. Achievement of the proper voltage relationships across the drain diodes may be effected by a proper selection of circuit components as hereinafter described.

It can be shown that during the half cycle when a thyratron tube fires, the voltage at its grid is expressed by the following equation:

$$V_g = \frac{1}{1+K''}\left[V\frac{2-K^2}{(1+K)(2+K)} - K''\right]$$

where V and K are described heretofore, $K=r/R$, $K''=r_p/r_g$, $r_p$=value of pulse resistance and $r_g$=value of grid resistance.

Figure 16:
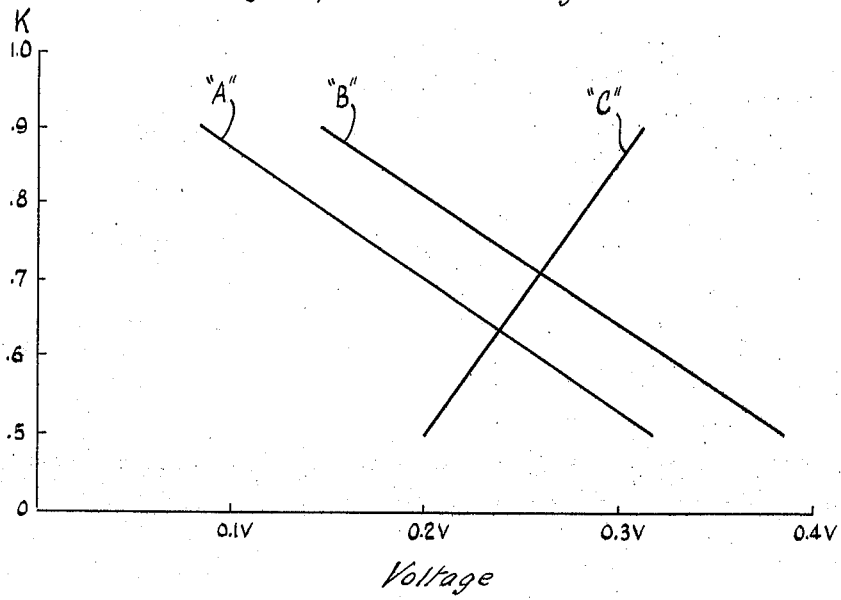
FIG. 16 shows a graph plotting triggering voltage against values for circuit constants.

From the grid voltage equation and the equation for the voltage at a major apex during the balanced condition of the bridge circuit, it is possible to plot a family of curves such as is shown in FIG. 16. Since, in order to apply effectively the voltage at a major apex to the grid of the thyratron tube, the value of grid resistor $r_g$ must be relatively high with respect to pulse resistor $r_p$, $K''$ must be less than 1 and preferably in the vicinity of 0.1. Curves A and B in FIG. 16 show, for various values of K, the voltage at the grid of a thyratron tube when the positive pulse causes the tube to fire. This grid voltage is substantially the voltage in the pulse lines. For curve A, $K''$ has been arbitrarily selected to be equal to 0.1 and for curve B, $K''$ has been arbitrarily selected to be equal to 0.05. Curve C is a plot of the voltage at a major apex for various values of K, less than 1, when the bridge is in balance due to a matched condition of the pair of binary digits. In order to pass, without impairment, the voltage pulse from the bridge circuit comparing the less significant unmatched pair of digits, the voltage in the pulse line must be less than the voltage at the major apex of the bridge circuit comparing the more significant matched pair of binary digits. If this is not so, the voltage in the pulse line will be drained. Therefore, for the curves shown in FIG. 16, that part of the curves A and B to the right of curve C may not be employed since these voltages are excessive. That part of curves A and B lying to the left of curve C indicates pulse line voltages less than the voltage at more significant major apices and therefore may be employed. From such curves, it is possible to select values of K and $K''$ to allow voltage pulses from bridge circuits comparing less significant unmatched pairs of binary digits to feed through to the thyratron tubes without impairment or drainage from bridge circuits comparing more significant matched pairs of binary digits. Use of such curves also makes it possible to select circuit values of K and $K''$ to produce a strong positive pulse at the grid of the thyratron tubes.

For the purpose of all preceding analyses, unless otherwise specifically referred to, the effects of leakage through diodes when the diodes are not conducting, and the effects of the voltage drop across the diodes when they are conucting, are not appreciable and for simplicity, these factors have been omitted in the discussion.

As an example of an operating circuit, I have found the following circuit component values to be effective when employed in a comparator circuit utilizing thyratron tubes as the triggering devices, the circuit being capable of comparing at least between 16 and 21 pairs of binary digits.

$r$=33,000 ohms
$R$=56,000 ohms
$r_p$=470,000 ohms
$r_g$=3,900,000 ohms
Voltage at $L_1$ and $L_2$ with respect to ground=110 volts The above example is stated by way of illustration only and is not intended to be limiting in any sense. With knowledge of the invention and the principles disclosed herein, other circuit parameters may be easily designed by those skilled in the art.

Thus, it is possible to determine whether the condition of two switches, which may represent a pair of binary digits, is matched or unmatched. When the first switch is closed and the second switch is open, a first triggering device is triggered indicating the condition of the switches. When the second switch is closed and the first switch is open, a second triggering device is triggered indicating that condition of the switches. When a plurality of pairs of switches are to be compared, the circuit will compare each pair in sequential order without being affected by conditions which are less significant to the switches being compared. The triggering devices may be arranged to energize a circuit producing and output voltage representative of the relative condition of the numbers or it may be arranged to operate controllers, such as motors, which would change the condition of a second group of switches to correspond to the condition of a first group of switches. If desired, the circuit could be easily adapted to control the direction of rotation of a motor by comparing the relative condition of two circuits, such as for example the open or closed condition of two switches. In the unmatched condition of the circuits, the motor may be made to rotate in a forward or reverse direction depending on which of the two circuits is closed.

When employed in conjunction with a digital encoder, the electronic comparator is capable of comparing the encoder's output in binary coded form with a desired binary coded number. The output of the comparator may then be adapted to operate a controller to cause the encoder to assume the position representing the desired binary coded number.

By combining the digital encoder and the comparator circuit, it is possible to devise a complete system for converting the analog position of the encoder associated with a rotatable element, to digital information, comparing that information with a different set of digital information representative of the desired position of the element and producing an output to control the element.

A complete system, showing the preferred embodiment of the invention, for controlling the position of a movable element such as the angular displacement of a rotatable element or the axial displacement of a shaft, combining the digital encoder and comparator circuit heretofore described, is shown in FIGS. 17 through 19. The system shown includes two encoding wheels 301 and 302 associated with the element to be controlled, a group of input switches 303a and 303b, a comparator circuit consisting of eight impedance bridge networks for the comparison of eight pairs of binary digits, output thyratron tubes 304 and 305, an alternating voltage source 306 and associated transformer 307, relays 308 and 309 and control motor 310. The desired position of the controlled element is fed into the comparator circuit in binary digital code by means of switches 303a and 303b which may be manual switches or automatic switching means including, for example, an automatic punched tape. Encoding wheel 301, shown in developed form, represents the units code wheel capable of setting up binary coded decimal inputs representing 0 to 9 (0000 to 1001) and is therefore the least significant code wheel. Code wheel 302, shown in developed form, represents the tens code wheel and is capable of setting up binary coded decimal inputs representing 0 to 90 in ten steps. For the figure shown, code wheel 302 is the most significant code wheel. On code wheel 302, transfer brush 320 representing the number "100" and transfer brush 321 representing "not-100" are unnecessary, but are shown included and made available in order to obtain representations of numbers of a higher order of magnitude if additional code wheels are utilized. It is apparent that for the code wheels shown, provision of an additional more significant bridge network (not shown) in FIG. 18, representing the number 100, and connecting transfer brush 320 thereto, permits indications and control for positions from 0 to 199. Absent this additional network, indication and control is possible for an output representative of only positions 0 to 99.

As has been described for the operation of the digital encoder, the angular disposition of each code wheel is translated into a binary digital code having an output from its digital information brushes. In FIGS. 17 and 18, the digital information brushes are connected respectively to an intermediate apex of a corresponding impedance bridge network which compares the condition of the digital information output brush with the corresponding information being fed into the comparator circuit by switches 303a and 303b. For example, the "80" brush 322, which is the most significant digital information brush, is connected through line 323 to intermediate apex 324 of bridge network 325 designed to compare the condition of digits corresponding to the number 80. The opposite intermediate apex 326 is connected to the "80" terminal 327 of input switch 303a. Common terminal 328 of input switch 303a is then connected to alternating voltage line $L_1$ 329. Thus, when common terminal 328 is connected to terminal 327, the number 80 in bindary digital code is represented and it is evident that voltage line $L_1$ 329 is connected to intermediate apex 326. Alternating voltage line $L_2$ 330 is connected through line 331 to potential bands 332 and 333 on the least significant code wheel 301 and potential band 334 on the most significant code wheel 302. As the angular displacement of the code wheels change, different digital outputs will be fed into the comparator circuit as heretofore described. In FIGS. 17 and 18, therefore, the code wheel digital information output is substituted for the second set of switches described in the comparator circuit for FIG. 15. Switches 303a and 303b are set up to indicate in binary digital code the desired position of the element and this code is represented by the condition of the plurality of switches connected into the comparator circuit between an intermediate apex and an alternating voltage source. The actual position of the element is also set up in binary digital code by the output brushes of the encoder and consists of the equivalent of a like plurality of switches connected into the comparator circuit between an opposite intermediate apex and an opposite polarity voltage source.

It is apparent, therefore, that the operation of the system is the same as heretofore described for the digital encoder and the comparator circuit.

When the condition of the input switches 303a and 303b is not matched with the condition of the digital information output from the code wheels, either thyratron tube 304 or thyratron tube 305 will fire. As heretofore explained, the impedance bridge circuits will compare the input and output information by comparing the binary digits in sequence from the most to the least significant. Pulses from bridge networks comparing unmatched less significant binary digits will be nullified until all more significant binary digits are matched.

When the condition of unmatched binary digits is such that thyratron tube 304 fires, it energizes relay 308. Since for the particular condition, the thyratron tube 304 conducts only during alternate half cycles, capacitor 340 is connected across the relay coil 308 and designed to maintain a flow of current through the relay coil 308 during the alternate half cycles when thyratron tube 304 is not conducting. Energization of relay coil 308 causes relay arm 341 to contact terminal 342 connected to a positive source of potential 343. When relay coil 308 is energized, relay coil 309 must be denergized and relay contact 344 will be contacting terminal 345 connected to ground. Control motor 310 is connected between relay contact arms 341 and 344. A circuit will therefore be set up which energizes control motor 310 causing current to flow through the armature of the control motor in one direction, thereby causing the control motor to rotate in a given direction.

When thyratron tube 305 fires, the relay coil 309 will be energized and relay coil 308 will be denergized. Accordingly, relay arm 344 will be connected to terminal 346 which is connected to a source of voltage 343, and relay contact arm 341 will be connected to terminal 347 which is grounded. This arrangement causes current to flow through control motor 310 in the opposite direction thereby causing control motor to rotate in the opposite direction. Thus, the control motor 310 rotates in one direction or the other depending on which thyratron tube fires. If neither thyratron tube fires, which is the situation when all pairs of binary digits are matched, both relays are deenergized and the armature of the control 310 is short circuited for quick stopping.

The control motor may be arranged to operate the movable element to cause it to move in a direction to assume the desired position as set up by the input switches 303a and 303b. As soon as the desired position is attained, the output of the digital encoder will match the input of the switches 303a and 303b and the control motor ceases to operate.

It is apparent, therefore, that since neither the digital encoder nor the comparator circuit of the invention depend for their performance on the operation of mechanical relays, slip rings or lead or lag brushes, an analog-digital conversion comparing and control system combining the digital encoder and comparator circuit herein described functions equally well at low speeds and at high speeds and is particularly adapted for use at high speeds. Control of a movable element is attained quickly, efficiently and without ambiguity at a cost which is substantially less than that for systems producing comparable results. It will thus be seen that the objects set forth among those made apparent from the preceding description are efficiently attained and, since certain changes may be made in the above system without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A digital encoder for translating the position of a movable element into coded electrical indications comprising, in combination, a plurality of rotatable code wheels adapted to be angularly disposed in specific relationship to the position of the movable element, driving means interposed between said code wheels for changing the speed of rotation of successive code wheels in a predetermined ratio, each of said code wheels having a plurality of circumferential bands thereon consisting of electrically conductive segments electrically separated from each other, a network of interlacing electrically conductive paths interconnecting some of said segments, at least two of said bands adapted to be energized in alternating relationship for succeeding digital representations of each code wheel, a plurality of pairs of transversely aligned brushes arranged in two groups on opposite sides of each of said code wheels, each pair contacting the surface of different bands, the two brushes comprising the pair being electrically interconnected, at least one of said pairs of brushes being adapted to provide the source of potential to this code wheel, and at least another of said pairs of brushes adapted to transfer a source of potential to the next succeeding code wheel, a plurality of output brushes associated with each code wheel and all said brushes, segmentation and interlaced electrically conductive paths being arranged cooperatively to energize said output brushes indicating a digital representation of the angular displacement of each of said code wheels.

2. A digital encoder having a plurality of code positions and digital representations thereof comprising, in combination, a commutating surface arranged in a plurality of circumferential bands having electrically conductive code segments electrically segregated from each other, at least one of said bands being connected to a source of potential, a second group of said bands corresponding to digital information bands, the number of said different digital representations being equal to one-half the number of code positions of said encoder, a third band comprising an energizing band, one of said information bands additionally comprising an energizing band, each of said energizing bands having segments electrically connected to segments of said information bands, said energizing bands being arranged over 180° of said commutating surface in a pattern of interdigitated castellations with that one of said bands connected to a source of potential, a plurality of pairs of transversely aligned brushes, including output brushes, arranged in two groups on opposite sides of said commutating surface, each pair contacting different bands with the two brushes comprising this pair being electrically interconnected and said brushes being cooperatively arranged with said bands and said segmentation to energize said output brushes indicating digital representations of either of two code positions of said encoder.

3. An electromechanical transducer for providing a digital code output representative of a shaft position comprising, commutator means adapted in a pattern to have electrically energized and nonenergized segments arranged to produce a digital code, said commutator means having two circumferential energizing bands adapted to have segments alternately energized and deenergized in succeeding digital representations, two groups of transversely aligned brushes spaced 180° apart contacting said commutator means, some of said brushes adapted to provide a source of potential to said commutator means, others of said brushes adapted to provide a digital code output, and still others of said brushes contacting said energizing bands adapted to interconnect electrically segments of different bands, means connecting deenergized brushes required to be energized in the next succeeding digital representation to that one of said two energizing bands about to be energized, means connecting energized brushes required to be deenergized in the next succeeding digital representation to that other of said two energizing bands about to be deenergized, means connecting energized brushes required to remain energized in the next succeeding digital representation to a brush providing a source of potential and means connecting deenergized brushes required to remain deenergized in the next succeeding digital representation to a nonenergized segment.

4. In an encoder for providing a digital code output representative of a shaft position, a rotatable code wheel angularly disposed in fixed relationship to said shaft position, said code wheel having thereon a plurality of circumferential bands consisting of a pattern of electrically conductive segments electrically separated from each other, a network of interlacing electrically conductive paths interconnecting some of said segments in a prearranged pattern, a first group of said bands comprising potential bands being connected to a source of potential, a second group of said bands corresponding to digits of information, another of said bands comprising an energizing band and one of said second group of said bands additionally comprising an energizing band, said energizing bands having portions thereof arranged in a pattern of interdigitated castellations in one of said potential bands, said castellations being electrically separated from each other, said pattern of castellations adapted to provide instantaneous alternating of potential from one energizing band to the other for each succeeding digital representation, a plurality of pairs of transversely aligned brushes arranged in two groups on opposite sides of said code wheel, each pair being interconnected and contacting the surface of only one of said bands, said brushes, segmentation of bands and network of interlacing conductive paths being adapted cooperatively to connect deenergized brushes next required to be energized to that portion of that one of said energizing bands about to be energized and adapted to connect energized brushes next required to be deenergized to that other of said energizing bands about to be deenergized.

5. In an encoder for providing a digital code output representative of a shaft position, a rotatable code wheel angularly disposed in fixed relationship to said shaft position, said code wheel having thereon a plurality of circumferential bands consisting of a pattern of electrically conductive segments electrically separated from each other, a network of interlacing electrically conductive paths interconnecting some of said segments in a prearranged pattern, a first group of said bands comprising potential bands being connected to a continuous source of potential, a second group of said bands comprising digital information bands, a third group of said bands comprising two energizing bands, said energizing bands being arranged in a pattern of inter-digitated castellations in one of said potential bands over 180° of said code wheel, said castellations being electrically separated from each other, a plurality of pairs of transversely aligned brushes arranged in two groups on opposite sides of said code wheel, each pair being interconnected and contacting the surface of only one of said bands, a first group of said brushes connected to a source of potential comprising potential brushes associated with the first group of said bands, a second group of said brushes comprising digital information brushes associated with the second group of said bands, a third group of said brushes comprising energizing brushes associated with the third group of said bands, said pattern of castellations being adapted to provide instantaneous alternating of potential from one energizing brush to the other for each succeeding digital representation, said brushes, segmentation of bands and network of interlacing conductive paths being adapted cooperatively to connect deenergized brushes next required to be energized to that energizing brush about to be energized, adapted to connect energized brushes next required to be deenergized to that other said energizing brush about to be deenergized, adapted to connect energized brushes next required to remain energized to a continuous potential band and adapted to connect denergized segments next required to remain deenergized to wholly separated segments.

6. A digital encoder for providing an output representative of a shaft position comprising a plurality of code wheels of different orders of significance angularly disposed in fixed relationship to said shaft position, driving means interposed between said code wheels changing the speed of rotation of successive code wheels in a predetermined ratio, said code wheels each having thereon a plurality of circumferential bands consisting of a pattern of electrically conductive segments electrically separated from each other and a network of interlacing electrically conductive paths interconnecting some of said segments in a prearranged pattern, a first group of said bands comprising potential bands, said potential bands having portions thereof continuously energized a second group of said bands comprising digital information output bands, a third group of said bands comprising two energizing bands, and a fourth group of said bands comprising potential transfer bands, a plurality of pairs of transversely aligned brushes arranged in two groups on opposite sides of each code wheel and adapted to contact the bands of the code wheel, a first group of said brushes comprising potential brushes associated with the first group of said bands, a second group of said brushes comprising digital information output brushes associated with the second group of said bands, a third group of said brushes comprising energizing brushes associated with the third group of said bands, and a fourth group of said brushes comprising potential transfer brushes associated with the fourth group of said bands, the brushes comprising a pair being interconnected, a source of electrical energizing potential connected to said potential brushes, said energizing bands and one of said potential bands on the least significant code wheel arranged in electrically separated interdigitated castellations over approximately 180° of said code wheel adapted to connect said energizing brushes in an alternating relationship to a potential brush for succeeding digital representations of said code wheel, all said brushes, segmentation of bands and network of interlacing conductive paths being adapted in a pattern to cooperate to connect deenergized brushes next required to be energized to that energizing brush about to be energized and to connect energized brushes next required to be deenergized to that other energizing brush about to be deenergized, and said potential transfer brushes being adapted to energize energizing bands on the next most significant code wheel in alternating relationship for succeeding digital positions of said code wheel.

7. The digital encoder defined in claim 6 wherein the least significant band of the digital information output bands of each of said code wheels additionally comprises one of said energizing bands.

8. A digital encoder for providing an output representative of a shaft position comprising a plurality of code wheels of different orders of significance angularly disposed in fixed relationship to said shaft position, driving means interposed between said code wheels changing the speed of rotation of successive code wheels in a predetermined ratio, said code wheels each having thereon a plurality of circumferential bands consisting of a pattern of electrically conductive segments electrically separated from each other, a network of interlacing electrically conductive paths interconnecting some of said segments in a prearranged pattern, a first group of said bands comprising potential bands, said potential bands having a potential continuously applied thereto, a second group of said bands comprising digital information output bands, a third group of said bands comprising two energizing bands, and another of said bands comprising a potential transfer band, a plurality of pairs of transversely aligned brushes arranged in two groups on opposite sides of each code wheel and adapted to contact the bands of the code wheel, a first group of said brushes comprising potential brushes associated with the first group of said bands, a second group of said brushes comprising digital information output brushes associated with the second group of said bands, a third group of said brushes comprising energizing brushes associated with the third group of said bands, and a fourth group of said brushes comprising a pair of potential transfer brushes associated with said potential transfer band, the brushes comprising a pair being interconnected except said pair comprising said potential transfer brushes, a source of electrical energizing potential connected to said potential brushes, said energizing bands and one of said potential bands on the least significant code wheel arranged in electrically separated interdigitated castellations over approximately 180° of said code wheel adapted to connect said energizing brushes in an alternating relationship to a potential brush for succeeding digital representations of said code wheel, all said brushes, segmentation of bands and network of interlacing conductive paths being adapted in a pattern to cooperate to connect deenergized brushes next required to be energized to that energizing brush about to be energized, adapted to connect energized brushes next required to be deenergized to that other energizing brush about to be deenergized, adapted to connect energized brushes next required to remain energized to a continuous potential band and adapted to connect deenergized segments next required to remain deenergized to wholly separated segments, and said potential transfer brushes being adapted to energize energizing brushes on the next most significant code wheel in alternating relationship for succeeding digital positions of said code wheel.

9. The digital encoder defined in claim 8 wherein the least significant band of the digital information output bands of each of said code wheels additionally comprises one of said energizing bands.

10. A digital encoder for translating the position of movable means into coded electrical indications comprising in combination, a code wheel adapted to be angularly disposed in specific relationship to the position of the movable means, said code wheel having a plurality of circumferential bands thereon each consisting of a prearranged pattern of electrically conductive segments electrically separated from each other, a prearranged network of interlacing electrically conductive paths interconnecting some of said segments of different bands, substantially one-half of said code wheel being adapted for effecting said interconnections between segments, a plurality of pairs of transversely aligned brushes arranged in two groups on opposite circumferential sides of said code wheel, each pair contacting the surface of different bands, the two brushes comprising the pair being electrically interconnected, at least one of said pairs of brushes being adapted to provide the source of potential to said code wheel, others of said brushes comprising digital information output brushes, means consisting of a pattern on said code wheel of interdigitated castellations adapted to energize two of said pairs of brushes comprising energizing brushes in alternating relationship for succeeding digital representations of said code wheel from one of said brushes which provides a source of potential, said energizing brushes during a change in code wheel position being arranged to be connected electrically to said digital information output brushes required to change digital output whereby said change in digital output occurs simultaneously and in like manner with said change of energization of said energizing brushes, and all said brushes, segmentation and interlaced electrically conductive paths being arranged cooperatively to energize digital information output brushes indicating a digital representation of the angular displacement of said code wheel.

11. An electronic comparison circuit for comparing two numbers in binary digital code and for energizing one circuit when the first number is greater than the second and for energizing a different circuit when the second number is greater than the first, comprising, a voltage source having two terminals of positive and negative polarity, a first triggering device connected to one of the terminals, said triggering device connected to energize means indicating that the first number is greater than the second number, a second triggering device connected to the other terminal, the said second triggering device connected to energize means indicating that said second number is greater than the first number, a plurality of impedance bridge circuits connected in cascade and equal to the number of pairs of binary digits being compared with each of said bridge circuits having two major apices and two intermediate apices, a plurality of pairs of two condition elements having an open and closed condition, each pair representing binary digits to be compared and each pair consisting of a first two condition element and a second two condition element, said first two condition element being connected between one intermediate apex of one of said bridge circuits and a voltage source terminal and said second two condition element being connected between an opposite intermediate apex of said bridge circuit and an opposite voltage source terminal, a first set of unidirectionally conductive means connecting said first and second triggering devices to opposite major apices of the bridge circuits, whereby said bridge circuits cause triggering signals to trigger the first triggering device when the first two condition element is closed and said second two condition element is open and cause said second triggering device to trigger when the second two condition element is closed and the first two condition element is open and cause neither triggering device to trigger when the pair of two condition elements is in the matched condition, a second set of unidirectionally conductive means coupling the cascaded bridge circuits to each other to allow triggering signals from bridge circuits comparing less significant binary digits to trigger the triggering devices when more significant binary digits are matched and means provided in each bridge circuit nullifying conflicting triggering signals from bridge circuits comparing less significant binary digits when more significant binary digits are unmatched.

12. An electronic comparison system for comparing two numbers in binary digital code and for energizing one circuit when the first number is greater than the second and for energizing a different circuit when the second number is greater than the first, comprising, an alternating voltage source having two terminals of positive and negative polarity, a first triggering device connected between ground and one terminal, the trigger operation of said triggering device being adapted to energize means indicating that the first number is greater than the second number, a second triggering device connected to the other terminal, the trigger operation of the second triggering device being adapted to energize means indicating that said second number is greater than the first number, a plurality of resistance bridge circuits connected in cascade and equal to the number of pairs of binary digits being compared with each of said bridge circuits having two major apices and two intermediate apices and having a resistance "r" connected between adjacent apices, and having one said major apex connected through a resistance "R" to one voltage source terminal and the other major apex similarly connected through a resistance "R" to the opposite voltage source terminal, the ratio of $r/R$ being a number less than the square root of two, a plurality of pairs of switches each pair representing binary digits to be compared and each pair consisting of a first switch and a second switch, said first switch being connected between one intermediate apex of one of said bridge circuits and a voltage source terminal and said second switch being connected between an opposite intermediate apex of said bridge circuit and an opposite voltage source terminal, a first set of unidirectionally conductive means connecting said first and second triggering devices to opposite major apices of the bridge circuits, said bridge circuits being adapted to cause triggering signals to trigger the first triggering device when the first switch is closed and said second switch is open and adapted to cause said second triggering device to trigger when the second switch is closed and the first switch is open and adapted to cause neither triggering device to trigger when the switches are in the matched condition, a second set of unidirectionally conductive means adapted to couple the cascaded bridge circuits to each other to allow triggering signals from bridge circuits comparing less significant binary digits to trigger the triggering devices when more significant binary digits are matched and means provided in each bridge circuit adapted to nullify conflicting triggering signals from bridge circuits comparing less significant binary digits when more significant binary digits are unmatched.

13. The electronic comparison system defined in claim 11 in which the triggering devices are thyratron tubes.

14. The electronic comparison system defined in claim 11 in which the first and the second sets of unidirectionally conductive means are semiconductor diodes.

15. Apparatus for electrically controlling the direction of rotation of a motor by comparing the relative conditions of two circuits, comprising in combination, two terminals having an alternating voltage source thereacross, a first triggering device which when triggered energizes means turning the motor in a forward direction, a second triggering device, which when triggered energizes means turning the motor in the reverse direction, a resistance bridge circuit having a pair of major apices and a pair of intermediate apices with means connecting one major apex to the first triggering device and means connecting the opposite major apex to the second triggering device, the first of the circuits to be compared connected between one intermediate apex of said bridge circuit and one of said terminals of said alternating voltage source and the second of the circuits to be compared connected between the opposite intermediate apex of said bridge circuit and the other of said terminals of the alternating voltage source, said bridge circuit being adapted to cause a positive pulse to trigger said first triggering device when the first circuit is closed and the second circuit is open, adapted to cause a positive pulse to trigger the second triggering device when the first circuit is open and the second circuit is closed and adapted to cause neither triggering device to trigger when the circuits are in a matched condition.

16. The apparatus defined in claim 15 in which the two circuits being compared comprise two switches.

17. The apparatus defined in claim 15 in which the first and second triggering devices are thyratron tubes.

18. An electrical circuit for comparing the relative condition of a pair of binary digits comprising a first and second two condition element, each having an open and closed condition representing the pair of binary digits to be compared, an impedance bridge circuit having two major apices and two intermediate apices with equal impedances connected between adjacent apices, an alternating voltage source having terminals of positive and negative polarity, means connecting said opposite major apices of said bridge circuit respectively to the alternating voltage terminals, the first said two condition element being connected between one intermediate apex of said bridge circuit and one terminal of the voltage source, the second said two condition element being connected between an opposite intermediate apex of said bridge circuit and the terminal having a voltage of opposite polarity, and a first and second triggering device each having means connecting said triggering devices to opposite major apices of said bridge circuit, said bridge circuit being adapted to cause the first said triggering device to trigger during alternate half cycles when said first two condition element is closed and said second two condition element is open, adapted to cause the second said triggering device to trigger during alternate half cycles when said second two condition element is closed and said first two condition element is open and adapted to cause neither triggering device to trigger when the two condition elements are in matched condition.

19. A comparator circuit for comparing the relative condition of two numbers arranged in binary coded form comprising, means simultaneously feeding into the circuit said two numbers in binary digital code, two source voltage terminals of alternating opposite polarity, a plurality of cascaded impedance bridge networks, connected between said source voltage terminals, each network being adapted to compare one pair of binary digits, and each network providing a positive output pulse in timed relationship with that positive terminal of said voltage source terminals representative of the relative condition of the pair of binary digits when said pair of digits is not matched, triggering means coupled to the output of said cascaded bridge networks capable of energizing a circuit to produce two discrete output voltages, the first of said output voltages being produced when the first of said binary numbers is greater than the second of said binary numbers and the second of said output voltages being produced when the second of said binary numbers is greater than the first and no output voltage being produced when the binary numbers are matched.

20. A comparator circuit for comparing the relative condition of two numbers arranged in binary coded form comprising, means simultaneously feeding into the circuit said two numbers in binary digital code, two source voltage terminals of alternating opposite positive and negative polarity, a plurality of cascaded impedance bridge networks connected between said source voltage terminals, each network adapted to compare one pair of binary digits, and each network providing a positive output pulse in timed relationship with that positive terminal of said voltage source terminals representative of the relative condition of the pair of binary digits when said pair of digits is not matched, triggering means coupled to the output of said cascaded bridge networks capable of energizing a circuit to produce two discrete output voltages, the first of said output voltages being produced when the first of said binary numbers is greater than the second of said binary numbers and the second of said output voltages being produced when the second of said binary numbers is greater than the first and no output voltage being produced when the binary numbers are matched, and means nullifying networks comparing less significant binary digits unless more significant binary digits are matched.

21. A comparator circuit as defined in claim 20 said nullifying means comprising a unidirectionally conductive device connected between the output of the network to be nullified and the network comparing the more significant pair of unmatched binary digits.

22. In a comparator circuit for comparing the relative condition of two binary coded numbers, a plurality of impedance bridge networks, each bridge network including four arms of equal impedance, each network connected in cascade, the number of said bridge networks being equal to the number of pairs of binary digits being compared, means feeding into each of said bridge networks a different pair of binary digits of said binary coded numbers being compared, and two triggering devices coupled to said bridge networks adapted to fire in a predetermined manner responsive to the difference in the relative condition of the binary coded numbers being compared.

23. A comparator circuit comprising first and second voltage source terminals, said terminals being of opposite polarity, an impedance bridge network having two major apices and two intermediate apices and having impedances connected between adjacent apices, means connecting the major apices of said impedance bridge network between the first and second voltage terminals, a first two condition element having an open and closed condition connected between the first voltage terminal and one intermediate apex, a second two condition element having an open and closed condition connected between the second voltage terminal and the opposite intermediate apex, a first pulse line connected to one major apex, a second pulse line connected to the other major apex, whereby a positive pulse is formed in the first pulse line during the time that the first terminal is positive when the first two condition element is closed and the second two condition element is open and a positive pulse is formed in the second pulse line during the time that the second terminal is positive when the first two condition element is open and the second two condition element is closed.

24. A comparator circuit comprising, first and second voltage source terminals, said terminals being of opposite polarity, a resistance bridge network having two major apices and two intermediate apices and having equal resistances connected between adjacent apices, resistance means connecting the major apices of said resistance bridge network between the first and second voltage terminals, a first two condition element having an open and closed condition connected between the first voltage terminal and one intermediate apex, a second two condition element having an open and closed condition connected between the second voltage terminal and the opposite intermediate apex, a first pulse line connected to one major apex, a second pulse line connected to the other major apex whereby a positive pulse is formed in the first pulse line during the time that the first terminal is positive when the first two condition element is closed and the second two condition element is open and a positive pulse is formed in the second pulse line during the time that the second terminal is positive when the first two condition element is open and the second two condition element is closed.

25. The comparator circuit defined in claim 24 in which the first and second two condition elements are switches.

26. A comparator circuit comprising first and second voltage source terminals, said terminals being of opposite polarity, a resistance bridge network having two major apices and two intermediate apices and having equal resistances $r$ connected between adjacent apices, a resistance R connecting the major apices of said resistance bridge network between the first and second voltage terminals, the ratio of $r/R$ being a number less than the square root of two, a first two condition element having an open and closed condition connected between the first voltage terminal and one intermediate apex, a second two condition element having an open and closed condition connected between the second voltage terminal and the opposite intermediate apex, a first pulse line connected to one major apex, a second pulse line connected to the other major apex whereby a positive pulse is formed in the first pulse line during the time that the first terminal is positive when the first two condition element is closed and the second two condition element is open and a positive pulse is formed in the second pulse line during the time that the second terminal is positive when the first two condition element is open and the second two condition element is closed.

27. A comparator circuit comprising first and second voltage source terminals, said terminals being of opposite polarity, a plurality of impedance bridge networks connected in cascade and arranged in sequence from most significant to least significant bridge networks and each network having two major apices and two intermediate apices and each having impedances connected between adjacent apices, means connecting the major apices of each of said impedance bridge networks between the first and second voltage terminals, a plurality of pairs of two condition elements each having an open and closed condition, said pairs being aranged in sequence from most significant to least significant pairs, each pair being associated with an impedance bridge network and each pair consisting of a first two condition element connected between the first voltage terminal and one intermediate apex of said associated bridge network and a second two condition element connected between the second voltage terminal and the opposite intermediate apex of said associated bridge network, a first pulse line, a second pulse line, a first group of unidirectionally conductive means coupling said first pulse line to one major apex of each of said bridge circuits, a second group of unidirectionally conductive means coupling said second pulse line to the other major apex of each of said bridge circuits, whereby the relative condition of the two condition elements comprising a pair is compared in sequence from the most to the least significant pair and a positive pulse is formed in the first pulse line during the time that the first terminal is positive when the most significant unmatched pair of two condition elements comprises a first two condition element which is closed and a second two condition element which is open and a positive pulse is formed in the second pulse line during the time that the second terminal is positive when the most significant unmatched pair of two condition elements comprises a first two condition element which is open and a second two condition element which is closed and additional unidirectionally conductive means adapted to nullify conflicting positive pulses forming at major apices comparing less significant pairs of two condition elements when more significant pairs of two condition elements are unmatched.

28. The comparator circuit defined in claim 27 in which each of the impedances comprises a resistance $r$ and the means connecting the major apices of each of the bridge networks between the first and second voltage terminals each comprise a resistance R, the ratio of $r/R$ being a number less than the square root of two.

29. The comparator circuit defined in claim 28 in which the two condition elements are switches.

30. The comparator circuit defined in claim 27 in which each of said unidirectionally conductive means includes diodes.

31. The comparator circuit defined in claim 28 in which said first and second groups of unidirectionally conductive means each comprise a resistance $r_p$ and a first diode connected in series from each major apex and a second diode coupling pulses fed through said resistance $r_p$ and said first diode from less significant bridge networks and in which a resistance $r_g$ is connected between said first pulse line and the first voltage terminal and a like resistance $r_g$ is connected between the second pulse line and the second voltage terminal, the ratio of $r_p/r_g$ being a number less than one.

32. An analog-digital conversion, comparing and control system comprising, in combination, a movable element, means for producing a first plurality of electrical indications in unique combinations each representative in binary digits of a number identifying a desired discrete disposition of the movable element, a digital encoder associated with the movable element adapted to generate a second plurality of electrical indications in unique combinations each representative in binary digits of a number identifying a discrete disposition of the movable element, a comparator circuit for comparing said first and second electrical indications, for sensing differences in the combinations thereof and for providing an electrical voltage representative of said differences, said comparator circuit comprising, two source voltage terminals of opposite polarity, means simultaneously feeding into the circuit of said first and second plurality of electrical indications in binary digits, each of said first and each of said second indications together comprising a pair of digits, a plurality of cascaded impedance bridge networks connected between said source voltage terminals, each network comparing one pair of binary digits, and each network providing a positive output pulse in timed relationship with that positive terminal of said voltage source terminals representative of the relative condition of the pair of binary digits when said pair of digits is not matched, triggering means coupled to the output of said cascaded bridge networks capable of energizing a circuit to produce two discrete output voltages, the first of said output voltages being produced when the first of said numbers is greater than the second of said numbers and the second of said output voltages being produced when the second of said numbers is greater than the first and no output voltage being produced when the numbers are matched, means nullifying networks comparing less significant binary digits unless more significant binary digits are matched, said digital encoder comprising, commutator means having electrically energized and nonenergized segments arranged to produce a digital code, said commutator means having two circumferential energizing bands having segments alternately energized and deenergized in succeeding digital representations, two groups of transversely aligned brushes spaced 180° apart contacting said commutator means, some of said brushes connected to one of said voltage source terminals of said comparator circuit whereby a source of potential is applied to said commutator means, others of said brushes providing a digital code output, and still others of said brushes contacting said energizing bands interconnecting electrically segments of different bands, means connecting deenergized brushes required to be energized in the next succeeding digital representation to that one of said two energizing bands about to be energized, means connecting energized brushes required to be deenergized in the next succeeding digital representation to that other of said two energizing bands about to be deenergized, means connecting energized brushes required to remain energized in the next succeeding digital representation to a brush providing a source of potential, means connecting deenergized brushes required to remain deenergized in the next succeeding digital representation to a nonenergized segment, and means responsive to said electrical voltage output from said comparator circuit for moving the movable element until the electrical indications generated by said digital encoder matches the electrical indication produced by said first mentioned means.

33. An analog-digital conversion comparing and control system comprising, in combination, a responsive movable element, means for producing a first plurality of electrical indications in unique combinations each representative in binary digital code digits of a number identifying a desired discrete disposition of the movable element, a digital encoder comprising a plurality of rotatable code wheels adapted to be angularly disposed in specific relationship to the position of the movable element, driving means interposed between said code wheels for changing the speed of rotation of successive code wheels in a predetermined ratio, each of said code wheels having a plurality of circumferential bands thereon consisting of electrically conductive segments electrically separated from each other, a network of interlacing electrically conductive paths interconnecting some of said segments, at least two of said bands adapted to be energized in alternating relationship for succeeding digital representations of each code wheel, a plurality of pairs of transversely aligned brushes arranged in two groups on opposite sides of each of said code wheels, each pair contacting the surface of different bands, the two brushes comprising the pair being electrically interconnected, at least one of said pairs of brushes being adapted to provide the source of potential to this code wheel, and at least another of said pairs of brushes adapted to transfer a source of potential to the next succeeding code wheel, a plurality of output brushes associated with each code wheel and all said brushes, segmentation and interlaced electrically conductive paths being arranged cooperatively to energize said output brushes indicating a digital representation of the angular displacement of each of said code wheels, said digital representations being a second plurality of electrical indications in unique combinations each representative in binary digital code digits of a number identifying an actual discrete disposition of said movable element, an electrical circuit for comparing such binary digits comprising a first and second terminal having an alternating voltage source thereacross as the source of potential, a plurality of cascaded bridge networks equal to the number of binary digits being compared, each bridge having a first and second major apex and a first and second intermediate apex with resistances connected between adjacent apices, means connecting said first and second major apices to the first and second terminals of alternating voltage source respectively, a first triggering device connected to the first terminal of the alternating voltage source, a second triggering device connected to the second terminal of the alternating voltage source, each of said means for producing a first plurality of electrical indications being connected between a different first intermediate apex of each of said bridge circuits and the first terminal of the alternating voltage source, each of said second plurality of electrical indications of said encoder being connected between a correspondingly opposite second intermediate apex of each of said bridge circuits and said second terminal of said source of potential, a first set of unidirectionally conductive means connecting the first triggering device to the second major apices of said bridge circuits, a second set of unidirectionally conductive means connecting the second triggering device to the first major apices of said bridge circuits, said bridge circuits being adapted to cause signals to trigger the first triggering device when said first plurality of electrical indications representing a binary number is greater than said second plurality of electrical indications representing a binary number, adapted to cause signals to trigger the second triggering device when said first plurality of electrical indications representing a binary number is less than said second plurality of electrical indications representing a binary number and adapted to cause neither triggering device to trigger when said first and second plurality of electrical indications are matched, different unidirectionally conductive means adapted to couple said bridge networks to each other to allow triggering signals from bridge networks comparing less significant binary digits to trigger the triggering devices when more significant binary digits are matched, means provided in each bridge network to nullify conflicting triggering signals from bridge networks comparing less significant binary digits when more significant binary digits are unmatched and means responsive to said triggering devices for moving the movable element until the second plurality of electrical indications matches the first plurality of electrical indications.

34. An analog-digital conversion, comparing and control system comprising, in combination, a responsive movable element, means for producing a first plurality of electrical indications in unique combinations each representative in binary digital code digits of a number identifying a desired discrete disposition of the movable element, a digital encoder comprising a code wheel adapted to be angularly disposed in specific relationship to the position of the movable element, said code wheel having a plurality of circumferential bands thereon each consisting of a prearranged pattern of electrically conductive segments electrically separated from each other, a prearranged network of interlacing electrically conductive paths interconnecting some of said segments of different bands, substantially one-half of said code wheel being adapted for effecting said interconnections between segments, a plurality of pairs of transversely aligned brushes arranged in two groups on opposite circumferential sides of said code wheel, each pair contacting the surface of different bands, the two brushes comprising the pair being electrically interconnected, at least one of said pairs of brushes being adapted to provide the source of potential to said code wheel, others of said brushes comprising digital information output brushes, means consisting of a pattern on said code wheel of interdigitated castellations adapted to energize two of said pairs of brushes comprising energizing brushes in alternating relationship for succeeding digital representations of said code wheel from one of said brushes which provides a source of potential, said energizing brushes during a change in code wheel position being arranged to be connected electrically to said digital information output brushes required to change digital output whereby said change in digital output occurs simultaneously and in like manner with said change of energization of said energizing brushes, and all said brushes, segmentation and interlaced electrically conductive paths being arranged cooperatively to energize digital information output brushes indicating a digital representation of the angular displacement of said code wheel, said digital representations being a second plurality of electrical indications in unique combinations each representative in binary digital code digits of a number identifying an actual discrete disposition of the movable element, comparison means connected to said output brushes and said first electrical indication means for comparing said first and second electrical indications, for sensing differences in the combinations thereof and for providing an electrical voltage representative of said differences, and means responsive to said electrical voltage for moving the movable element until the electrical indications generated by said digital encoder matches the electrical indication produced by said first mentioned means.

35. The analog-digital conversion, comparing and control system defined in claim 34 in which said comparison means comprises a plurality of cascaded impedance bridge networks equal to the number of pairs of binary digits being compared and triggering devices coupled to said bridge networks adapted to trigger in a predetermined manner responsive to the difference in the pairs of binary digits being compared.

36. The analog-digital conversion, comparing and control system defined in claim 35 in which the triggering devices are thyratron tubes.

37. An analog-digital conversion, comparing and control system comprising, in combination, a rotatable member, means for producing a first plurality of electrical indications in unique combinations each representative in binary digital code digits of a number identifying a desired discrete angular disposition of said rotatable member, a digital encoder for providing an output representative of a shaft position comprising a plurality of code wheels of different orders of significance angularly disposed in fixed relationship to said shaft position, driving means interposed between said code wheels changing the speed of rotation of successive code wheels in a predetermined ratio, said code wheels each having thereon a plurality of circumferential bands consisting of a pattern of electrically conductive segments electrically separated from each other, a network of interlacing electrically conductive paths interconnecting some of said segments in a prearranged pattern, a first group of said bands comprising potential bands, said potential bands having a potential continuously applied thereto, a second group of said bands comprising digital information output bands, a third group of said bands comprising two energizing bands, and another of said bands comprising a potential transfer band, a plurality of pairs of transversely aligned brushes arranged in two groups on opposite sides of each code wheel and adapted to contact the bands of the code wheel, a first group of said brushes comprising potential brushes associated with the first group of said bands, a second group of said brushes comprising digital information output brushes associated with the second group of said bands, a third group of said brushes comprising energizing brushes associated with the third group of said bands, and a fourth group of said brushes comprising a pair of potential transfer brushes associated with said potential transfer band, the brushes comprising a pair being interconnected except said pair comprising said potential transfer brushes, a source of electrical energizing potential connected to said potential brushes, said energizing bands and one of said potential bands on the least significant code wheel arranged in electrically separated interdigitated castellations over approximately 180° of said code wheel adapted to connect said energizing brushes in an alternating relationship to a potential brush for succeeding digital representations of said code wheel, all said brushes, segmentation of bands and network of interlacing conductive paths being adapted in a pattern to cooperate to connect deenergized brushes next required to be energized to that energizing brush about to be energized, adapted to connect energized brushes next required to be deenergized to that other energizing brush about to be deenergized, adapted to connect energized brushes next required to remain energized to a continuous potential band and adapted to connect deenergized segments next required to remain deenergized to wholly separated segments, and said potential transfer brushes being adapted to energize energizing brushes on the next most significant code wheel in alternating relationship for succeeding digital positions of said code wheel, the shaft in said digital encoder being the element which comprises the rotatable member, said digital information output brushes of said encoder adapted to generate a second plurality of electrical indications in unique combinations each representative in binary digital code digits of a number identifying an actual discrete angular disposition of said rotatable member, a comparator circuit for comparing the relative condition of said first and second plurality of electrical indications, means simultaneously connecting into the comparator circuit said first and second plurality of electrical indications, a positive and negative terminal having an alternating voltage source thereacross as the source of electrical energizing potential, said comparator circuit consisting of a plurality of cascaded impedance bridge networks connected between the positive and negative terminals, each network being adapted to compare one of said first plurality of electrical indications with one of said second plurality of electrical indications and each network being adapted to produce an output pulse in timed relationship with the positive potential terminal of said alternating voltage source representative of the difference in the relative condition of the electrical indications being compared, triggering means coupled to the bridge networks and to the positive and negative terminals, said triggering means being responsive to the output pulse from said networks and adapted to produce a discrete electrical output voltage and means responsive to said electrical output voltage for rotating said rotatable member until the electrical indications generated by said digital encoder matches the electrical indication produced by said first mentioned means.

38. An analog-digital conversion, comparing and control system, comprising, in combination, a responsive rotatable member, means for producing a first plurality of electrical indications in unique combinations each representative in binary digital code digits of a number identifying a desired discrete angular disposition of said rotatable member, a digital encoder for providing an output representative of a shaft position comprising a plurality of code wheels of different orders of significance angularly disposed in fixed relationship to said shaft position, driving means interposed between said code wheels changing the speed of rotation of successive code wheels in a predetermined ratio, said code wheels each having thereon a plurality of circumferential bands consisting of a pattern of electrically conductive segments electrically separated from each other and a network of interlacing electrically conductive paths interconnecting some of said segments in a prearranged pattern, a first group of said bands comprising potential bands, said potential bands having portions thereof continuously energized, a second group of said bands comprising digital information output bands, a third group of said bands comprising two energizing bands, and a fourth group of said bands comprising potential transfer bands, a plurality of pairs of transversely aligned brushes arranged in two groups on opposite sides of each code wheel and adapted to contact the bands of the code wheel, a first group of said brushes comprising potential brushes associated with the first group of said bands, a second group of said brushes comprising digital information output brushes associated with the second group of said bands, a third group of said brushes comprising energizing brushes associated with the third group of said bands, and a fourth group of said brushes comprising potential transfer brushes associated with the fourth group of said bands, the brushes comprising a pair being interconnected, a source of electrical energizing potential connected to said potential brushes, said energizing bands and one of said potential bands on the least significant code wheel arranged in electrically separated interdigitated castellations over approximately 180° of said code wheel adapted to connect said energizing brushes in an alternating relationship to a potential brush for succeeding digital representations of said code wheel, all said brushes, segmentation of bands and network of interlacing conductive paths being adapted in a pattern to cooperate to connect deenergized brushes next required to be energized to that energizing brush about to be energized and to connect energized brushes next required to be deenergized to that other energizing brush about to be deenergized, and said potential transfer brushes being adapted to energize energizing bands on the next most significant code wheel in alternating relationship for succeeding digital positions of said code wheel, the shaft in said digital encoder being the element which comprises the rotatable member, said digital information output brushes of said encoder adapted to generate a second plurality of electrical indications in unique combinations each representative in binary digital code digits of a number identifying an actual discrete angular disposition of said rotatable member, a comparator circuit for comparing the relative condition of said first and second plurality of electrical indications, means simultaneously connecting into the comparator circuit said first and second plurality of electrical indications, a positive and negative terminal having an alternating voltage source thereacross as the source of electrical energizing potential, said comparator circuit consisting of a plurality of cascaded impedance bridge networks connected between the positive and negative terminals, each network being adapted to compare one of said first plurality of electrical indications with one of said second plurality of electrical indications and each network being adapted to produce an output pulse in timed relationship with the positive terminal of said alternating voltage source representative of the difference in the relative condition of the electrical indications being compared, means nullifying output pulses from all networks less significant than the output pulse from the network comparing the most significant unmatched pair of electrical indications, triggering means coupled to the bridge networks and to the positive and negative terminals, said triggering means being responsive to the output pulse from said networks and adapted to produce a discrete electrical output voltage and means responsive to said electrical output voltage for rotating said rotatable member until the electrical indications generated by said digital encoder matches the electrical indication produced by said first mentioned means.

39. An analog-digital conversion, comparing and control system comprising, a responsive movable element, means for producing a first plurality of electrical indications in unique combinations each representative in binary digital code of a number identifying a desired discrete disposition of the movable element, a digital encoder associated with the movable element and adapted to provide a second plurality of electrical indications in unique combinations each representative in binary digital code of a number identifying a discrete disposition of said movable element, an electronic comparison circuit for comparing two numbers in binary digital code and for energizing one circuit when the first number is greater than the second and for energizing a different circuit when the second number is greater than the first, comprising, a voltage source having two terminals of positive and negative polarity, a first triggering device connected to one of the terminals, said triggering device connected to energize means indicating that the first number is greater than the second number, a second triggering device connected to the other terminal, the said second triggering device connected to energize means indicating that said second number is greater than the first number, a plurality of impedance bridge circuits connected in cascade and equal to the number of pairs of binary digits being compared with each of said bridge circuits having two major apices and two intermediate apices, a plurality of pairs of two condition elements having an open and closed condition, each pair representing binary digits to be compared and each pair consisting of a first two condition element and a second two condition element, said first two condition element being connected between one intermediate apex of one of said bridge circuits and a voltage source terminal and said second two condition element being connected between an opposite intermediate apex of said bridge circuit and an opposite voltage source terminal, a first set of unidirectionally conductive means connecting said first and second triggering devices to opposite major apices of the bridge circuits, whereby said bridge circuits cause triggering signals to trigger the first triggering device when the first two condition element is closed and said second two condition element is open and cause said second triggering device to trigger when the second two condition element is closed and the first two condition element is open and cause neither triggering device to trigger when the pair of two condition elements is in the matched condition, a second set of unidirectionally conductive means coupling the cascaded bridge circuits to each other to allow triggering signals from bridge circuits comparing less significant binary digits to trigger the triggering devices when more significant binary digits are matched and means provided in each bridge circuit nullifying conflicting triggering signals from bridge circuits comparing less significant binary digits when more significant binary digits are unmatched, said first two condition elements of the plurality of pairs of two condition elements being the first plurality of electrical indication means and said second two condition elements being the second plurality of electrical indication means, said digital encoder comprising a plurality of rotatable code wheels angularly disposed in specific relationship to the position of the movable element, driving means interposed between said code wheels for changing the speed of rotation of successive code wheels in a predetermined ratio, each of said code wheels having a plurality of circumferential bands thereon consisting of electrically conductive segments electrically separated from each other, a network of interlacing electrically conductive paths interconnecting some of said segments, at least two of said bands adapted to be energized in alternating relationship for succeeding digital representations of each code wheel, a pluraltiy of pairs of transversely aligned brushes arranged in two groups on opposite sides of each of said code wheels, each pair contacting the surface of different bands, the two brushes comprising the pair being electrically interconnected, at least one of said pairs of brushes being connected to a voltage source terminal and at least another of said pairs of brushes adapted to transfer potential to the next succeeding code wheel, a plurality of output brushes associated with each code wheel, all said brushes, segmentation and interlaced electrically conductive paths being arranged cooperatively to energize said output brushes indicating a digital representation of the angular displacement of each of said code wheels and means responsive to said triggering devices for moving the movable element until the second plurality of electrical indications matches the first plurality of electrical indications.

References Cited by the Examiner
UNITED STATES PATENTS

| | | | |
|---|---|---|---|
| 2,537,427 | 1/1951 | Seid et al. | 318—28 |
| 2,580,768 | 1/1952 | Hamilton et al. | 235—61.7 |
| 2,829,828 | 4/1958 | Hollenbach | 235—179 |
| 2,930,027 | 3/1960 | Aylward et al. | 340—149 |
| 2,953,773 | 9/1960 | Nicolantonio. | |
| 2,972,740 | 2/1961 | Lahti | 340—347 |
| 2,977,574 | 3/1961 | Pouliart et al. | 340—149 |
| 3,000,001 | 9/1961 | Brink | 340—146.2 |

MALCOLM A. MORRISON, *Primary Examiner.*

DARYL W. COOK, *Examiner.*